(12) United States Patent
Tanaka et al.

(10) Patent No.: US 11,765,304 B2
(45) Date of Patent: Sep. 19, 2023

(54) PRINTING APPARATUS, CONTROL METHOD, PRINTING SYSTEM, AND STORAGE MEDIUM DETERMINING INK COLOR FOR PRINTING CODE BY EXCLUDING INK COLOR SATISFYING A CONDITION

(71) Applicant: CANON KABUSHIKI KAISHA, Tokyo (JP)

(72) Inventors: Wakako Tanaka, Tokyo (JP); Takashi Nakamura, Kanagawa (JP); Naoki Sumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/891,254

(22) Filed: Aug. 19, 2022

(65) Prior Publication Data
US 2023/0053580 A1    Feb. 23, 2023

(30) Foreign Application Priority Data
Aug. 20, 2021    (JP) .................. 2021-134890

(51) Int. Cl.
H04N 1/60    (2006.01)
H04N 1/32    (2006.01)
B41J 2/21    (2006.01)
H04N 1/00    (2006.01)

(52) U.S. Cl.
CPC .......... *H04N 1/6008* (2013.01); *B41J 2/2139* (2013.01); *H04N 1/00015* (2013.01); *H04N 1/00082* (2013.01); *H04N 1/32309* (2013.01); *H04N 1/605* (2013.01); *H04N 2201/3269* (2013.01)

(58) Field of Classification Search
None
See application file for complete search history.

(56) References Cited

U.S. PATENT DOCUMENTS 7,463,384 B2    12/2008    Tsuchiya et al.
10,265,947 B2    4/2019    Sumi
10,953,651 B2    3/2021    Sumi
2021/0170744 A1    6/2021    Sumi

FOREIGN PATENT DOCUMENTS

JP    2011-248577 A    12/2011

*Primary Examiner* — Scott A Rogers
(74) *Attorney, Agent, or Firm* — Venable LLP

(57) ABSTRACT

There is provided a printing apparatus including an obtaining unit configured to obtain print data in which in imposition image data in which one or more images are imposed in a print region, a code for identifying each image in the imposition image data is embedded; a determination unit configured to determine an ink color to be used to print the code by excluding an ink color satisfying a predetermined condition from candidates for the ink color to be used to print the code; and a print control unit configured to print the code based on the print data obtained by the obtaining unit using a plurality of nozzle arrays for the ink color determined by the determination unit.

21 Claims, 20 Drawing Sheets

FIG.15A
FIG.15B
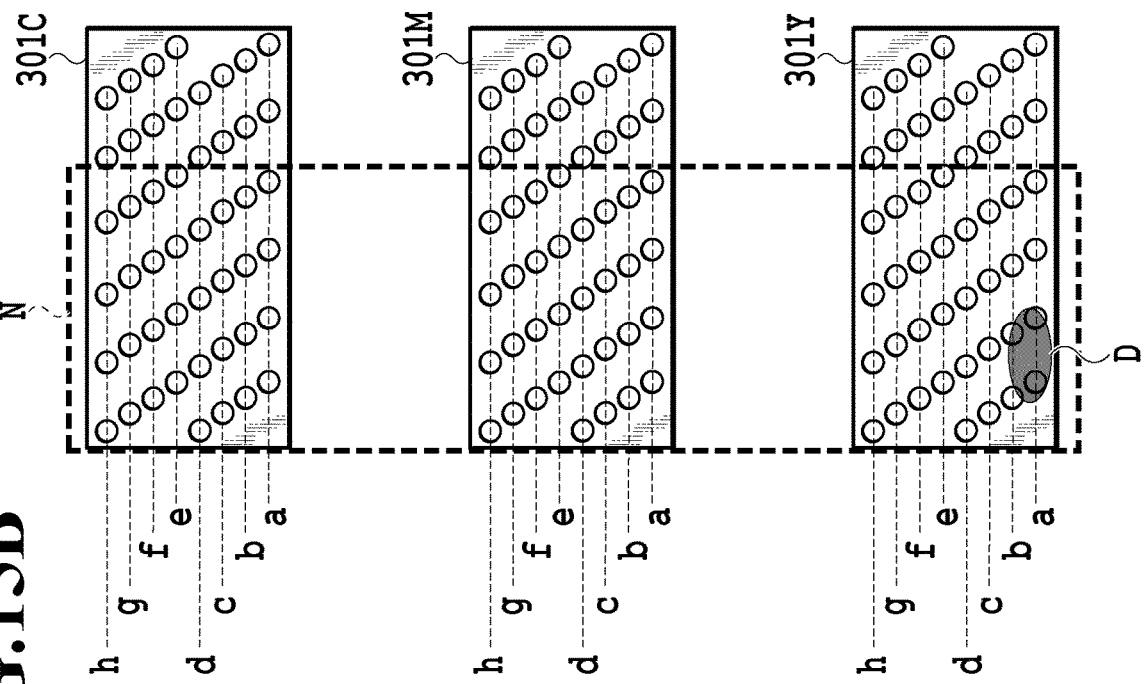
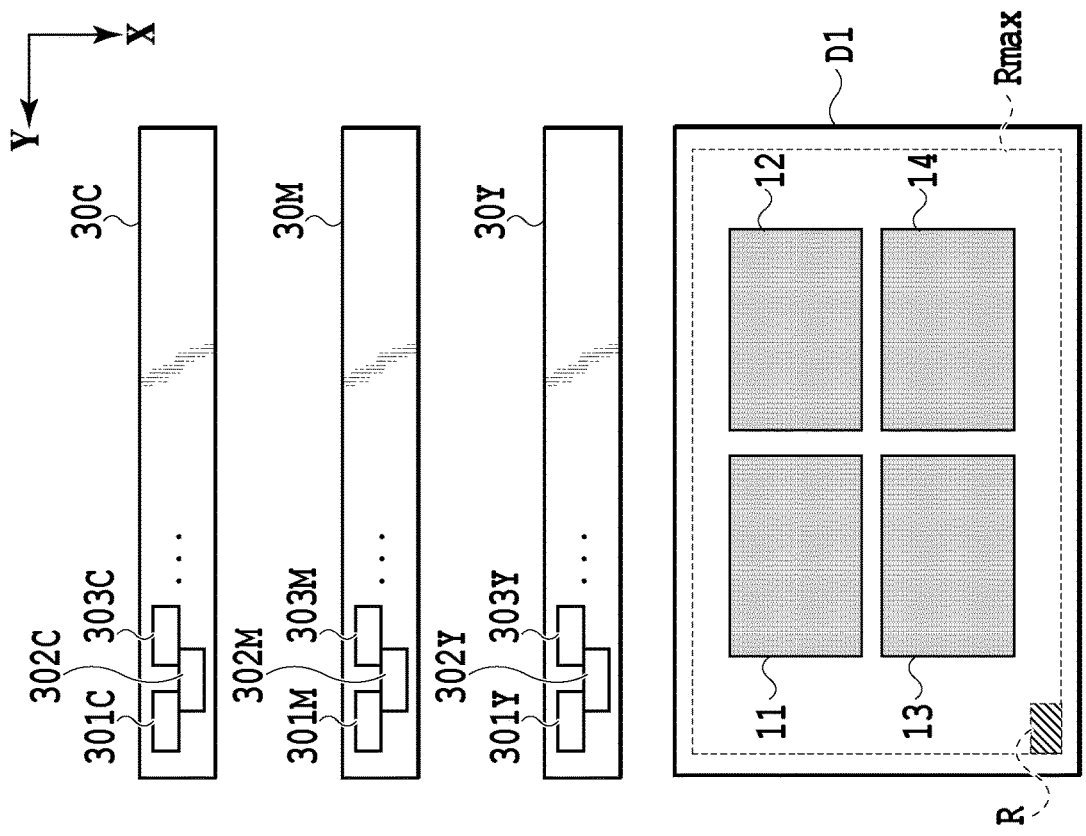

| R | G | B | K | C | M | Y |
|---|---|---|---|---|---|---|
| 0 | 255 | 255 | 0 | 255 | 0 | 0 |
| 16 | 255 | 255 | 0 | 240 | 0 | 0 |
| 32 | 255 | 255 | 0 | 223 | 0 | 0 |
| 48 | 255 | 255 | 0 | 206 | 0 | 0 |
| 64 | 255 | 255 | 0 | 190 | 0 | 0 |
| 80 | 255 | 255 | 0 | 174 | 0 | 0 |
| 96 | 255 | 255 | 0 | 157 | 0 | 0 |
| 112 | 255 | 255 | 0 | 141 | 0 | 0 |
| 128 | 255 | 255 | 0 | 125 | 0 | 0 |
| 144 | 255 | 255 | 0 | 109 | 0 | 0 |
| 160 | 255 | 255 | 0 | 92 | 0 | 0 |
| 176 | 255 | 255 | 0 | 76 | 0 | 0 |
| 192 | 255 | 255 | 0 | 60 | 0 | 0 |
| 208 | 255 | 255 | 0 | 44 | 0 | 0 |
| 224 | 255 | 255 | 0 | 27 | 0 | 0 |
| 240 | 255 | 255 | 0 | 11 | 0 | 0 |
| 255 | 255 | 255 | 0 | 0 | 0 | 0 |

FIG.17

PRINTING APPARATUS, CONTROL METHOD, PRINTING SYSTEM, AND STORAGE MEDIUM DETERMINING INK COLOR FOR PRINTING CODE BY EXCLUDING INK COLOR SATISFYING A CONDITION

BACKGROUND OF THE INVENTION

Field of the Invention

The present invention relates to a technique to inspect a printed subject output from a printing apparatus.

Description of the Related Art

In recent years, the number of printing apparatuses that perform variable printing has increased. The variable printing shall mean continuously printing different patterns one by one with no plate.

In Japanese Patent Laid-Open No. 2011-248577 (hereinafter referred to as Literature 1), on pages in a printed subject to be inspected, identification information indicating original image data to be compared associated with each page is printed. The identification information is printed in the form of a one-dimensional bar code, a two-dimensional bar code, a numerical value, or the like (hereinafter collectively referred to as a code). In a case where the printed subject to be inspected is read, the code is read at the same time and compared in association with original data, so that the quality of the printed subject is inspected.

SUMMARY OF THE INVENTION

Various factors of the apparatus cause a defect in the printed subject. Specifically, in an inkjet printing apparatus, trouble with a printing nozzle such as clogging with an ink stuck to the printing nozzle, dust adhesion to the vicinity of the nozzle, and difficulty in discharge due to large bubbles across a common flow path for each nozzle may cause a defect. In a case where a defective portion overlaps a print region of the code, there is a possibility that a portion of the code lacks and that the code cannot be analyzed or may be associated with original image data different from the original image data to be compared indicated by the code.

A printing apparatus according to one aspect of the present invention includes an obtaining unit configured to obtain print data in which, in imposition image data in which one or more images are imposed in a print region, a code for identifying each image in the imposition image data is embedded, a determination unit configured to determine an ink color to be used to print the code by excluding an ink color satisfying a predetermined condition from candidates for the ink color to be used to print the code, and a print control unit configured to print the code based on the print data obtained by the obtaining unit using a plurality of nozzle arrays for the ink color determined by the determination unit.

Further features of the present invention will become apparent from the following description of exemplary embodiments with reference to the attached drawings.

BRIEF DESCRIPTION OF THE DRAWINGS

FIGS. 15A and 15B are explanatory diagrams of a printing nozzle corresponding to the position of a code embedded region;
FIG. 17 is a diagram showing a portion of a look-up table used in an ink color conversion processing unit.

DESCRIPTION OF THE EMBODIMENTS

First Embodiment

Figure 1:
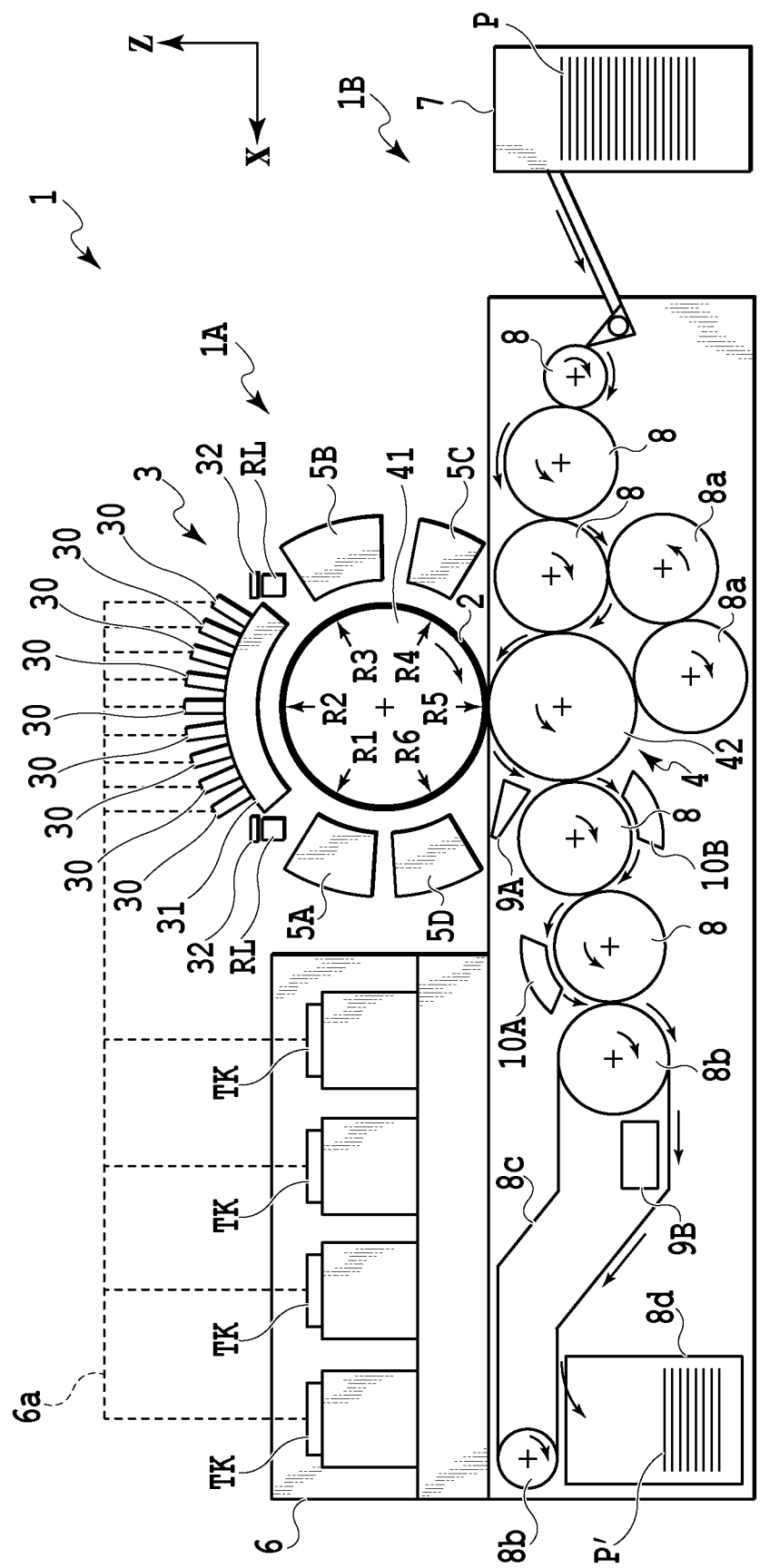
FIG. 1 is a schematic diagram of a printing system.

An embodiment of the present invention will be described below with reference to the drawings. In each drawing, arrows X and Y indicate a horizontal direction and are orthogonal to each other. Arrow Z indicates a vertical direction.
Printing System FIG. 1 is a front view schematically showing a printing system 1 according to one embodiment of the present invention. The printing system 1 is a single-wafer inkjet printer producing a printed subject P' by transferring an ink image to a print medium P via a transfer body 2. The printing system 1 includes a printing apparatus 1A and a conveying device 1B. In the present embodiment, an X direction, a Y direction, and a Z direction indicate a width direction (entire length direction), a depth direction, and a height direction of the printing system 1, respectively. The print medium P is conveyed in the X direction.

It should be noted that "printing" includes not only the case of forming significant information such as a character and a figure, but also widely includes the case of forming images, patterns, and the like on a print medium regardless of whether the images, patterns, and the like are significant or the case of processing the medium, and it does not matter whether a printed one is a manifestation so as to be visually perceived by a human. Further, in the present embodiment, sheet-shaped paper is assumed as the "print medium," but a cloth, a plastic film, or the like may be used.

A component for an ink is not specifically limited, but in the present embodiment, a case is assumed where a water-based pigment ink including a pigment, which is a coloring material, water, and a resin is used.

Printing Apparatus

The printing apparatus 1A includes a printing unit 3, a transfer unit 4 and peripheral units 5A to 5D, and a supply unit 6.

Printing Unit

Figure 2:
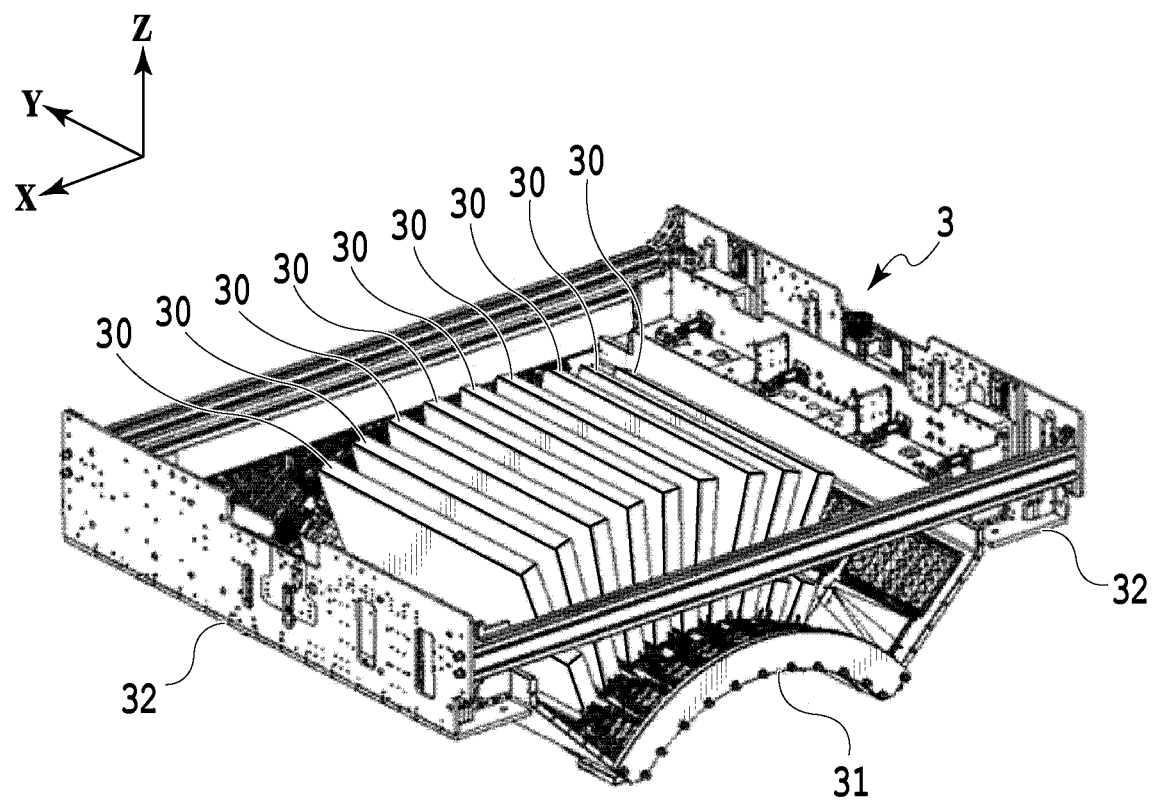
FIG. 2 is a perspective view of a printing unit.
Figure 3:
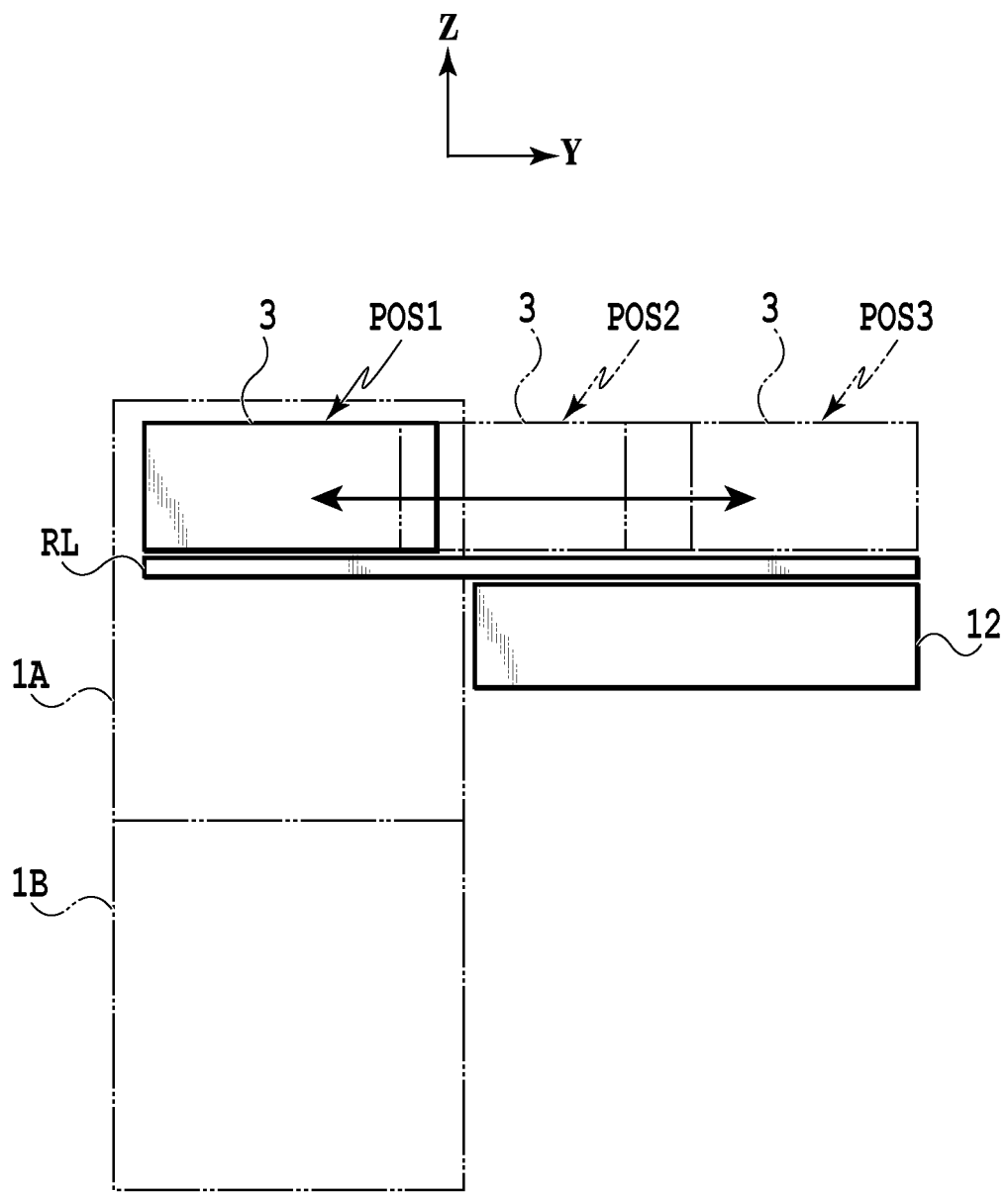
FIG. 3 is an explanatory diagram of a displacement mode of the printing unit.

The printing unit 3 includes a plurality of print heads 30 and a carriage 31. See FIGS. 1 and 2. FIG. 2 is a perspective view of the printing unit 3. Each of the print heads 30 discharges a liquid ink to the transfer body 2 and forms an ink image of a printed image on the transfer body 2.

Figure 8:
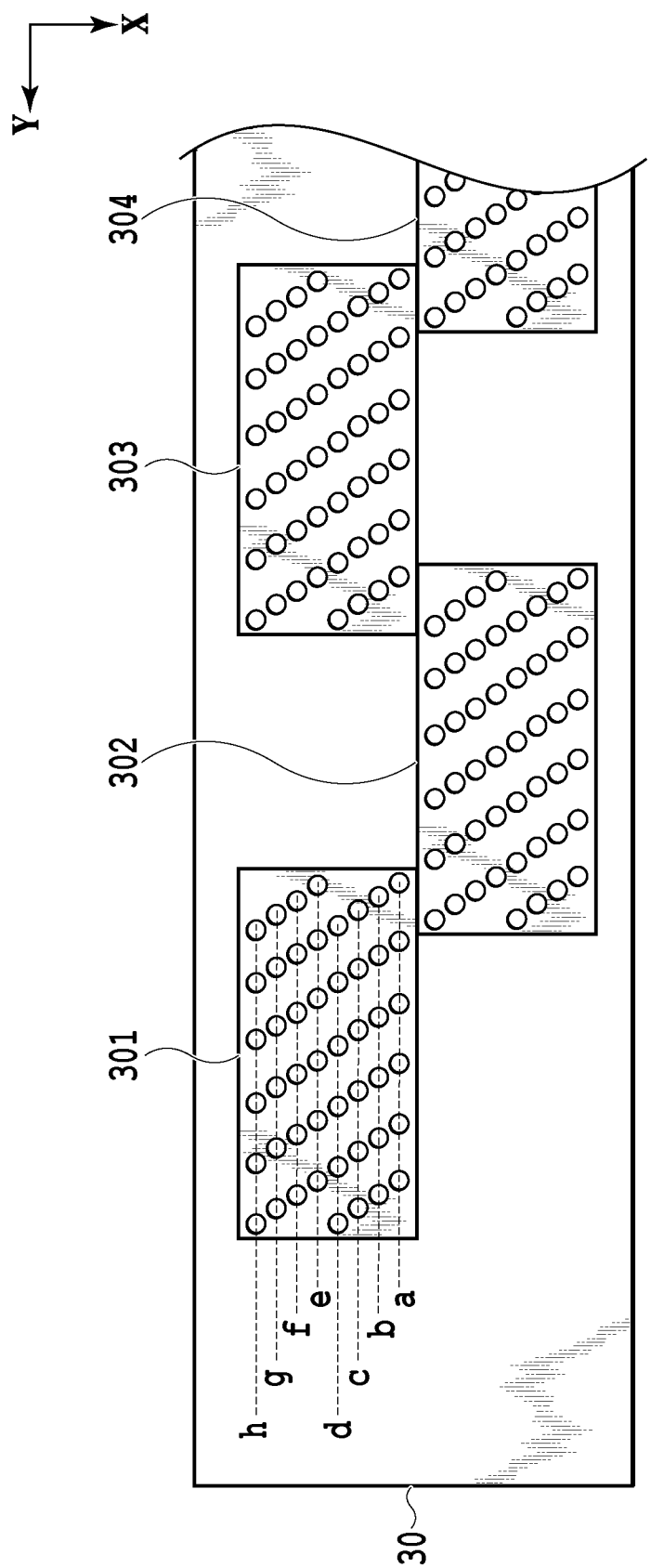
FIG. 8 is a diagram showing a nozzle alignment in a print head.

In the case of the present embodiment, each print head 30 is a full-line head extending in the Y direction, and nozzles are arranged in a range covering the width of an image print region of a maximum size of usable print medium. The print head 30 has an ink discharge surface through which a nozzle is opened on the lower surface of the print head 30, and the ink discharge surface faces a surface of the transfer body 2 through a minute gap (e.g. several millimeters). FIG. 8 is a diagram showing a nozzle alignment in the print head 30. As shown in the diagram, a plurality of discharge substrates 301, 302, 303, 304 . . . are arranged in the print head 30 in the state of being overlapped in the Y direction. Eight rows of nozzle arrays a to h extending in a nozzle alignment direction are arranged on each discharge substrate. A nozzle interval in the Y direction of each nozzle array is 1200 dpi. In this embodiment, the nozzle arrays a to d are arranged so as to be displaced by ¼ of 1200 dpi in the x direction and the nozzle array a and the nozzle array e are arranged at the same position on a Y coordinate. Similarly, the nozzle array b and the nozzle array f, the nozzle array c and the nozzle array g, and the nozzle array d and the nozzle array h are arranged in the same position on the Y coordinate. With the nozzle arrays arranged in the same position on the Y coordinate, it is possible to overlay dots discharged from each array on the same coordinate on the print medium P and print the dots. The discharge substrates 301, 302, 303, 304 . . . are arranged along the nozzle alignment direction and are arranged in a direction in which a plurality of print heads 30 in which similar nozzles are aligned intersect in the nozzle alignment direction. Then, inks in a plurality of colors are discharged onto corresponding regions on the print medium, so that an image is printed.

In the case of the present embodiment, the transfer body 2 moves cyclically on a circular track, so that the plurality of print heads 30 are arranged radially.

Each nozzle is provided with an discharge element. The discharge element is, for example, an element that generates pressure in the nozzle to discharge an ink in the nozzle and a known technique for an inkjet head of an inkjet printer is applicable to the discharge element. Examples of the discharge element include, for example, an element that discharges the ink by causing film boiling in the ink with an electrothermal converter to form bubbles, an element that discharges the ink with an electromechanical converter, and an element that uses static electricity to discharge the ink. From the viewpoint of high-speed and high-density printing, a discharge element using an electrothermal converter can be used.

In the case of the present embodiment, nine print heads 30 are provided. Each print head 30 discharges different types of inks. The different types of inks are, for example, inks different in a coloring material, such as a yellow ink, a magenta ink, a cyan ink, and a black ink. One print head 30 discharges one type of ink but may discharge a plurality of types of inks. In a case where the plurality of print heads 30 are provided as described above, some of the print heads 30 may discharge an ink (e.g. a clear ink) which includes no coloring material.

The carriage 31 supports the plurality of print heads 30. An end of each print head 30 on an ink discharge surface side is fixed to the carriage 31. This makes it possible to maintain more precisely a gap between the ink discharge surface and the front surface of the transfer body 2. The carriage 31 is displaceable while mounting the print heads 30 under the guidance of guide members RL. In the case of the present embodiment, the guide members RL are rail members extending in the Y direction and are provided in pairs separately in the X direction. Each side portion of the carriage 31 in the X direction is provided with a slide portion 32. Each slide portion 32 engages a corresponding guide member RL and slides in the Y direction along the guide member RL.

Transfer Unit

A transfer unit 4 will be described with reference to FIG. 1. The transfer unit 4 includes a transfer drum (transfer cylinder) 41 and an impression cylinder 42. The cylinders are rotation bodies that rotate around a rotation axis in the Y direction and have a cylindrical outer peripheral surface. In FIG. 1, arrows shown in the figures of the transfer drum 41 and the impression cylinder 42 indicate the rotation directions of the transfer drum 41 and the impression cylinder 42. The transfer drum 41 rotates clockwise and the impression cylinder 42 rotates counterclockwise.

The transfer drum 41 is a base material that supports the transfer body 2 on the outer peripheral surface of the transfer drum 41. The transfer body 2 is continuously or intermittently provided on the outer peripheral surface of the transfer drum 41 in a circumferential direction. In the case of being provided continuously, the transfer body 2 is formed in an endless band shape. In the case of being provided intermittently, the transfer body 2 is formed into a plurality of segments in an ended band shape, and each segment can be arranged on the outer peripheral surface of the transfer drum 41 in an arc shape at equal pitches.

Due to the rotation of the transfer drum 41, the transfer body 2 moves cyclically on the circular track. Depending on a rotation phase of the transfer drum 41, the position of the transfer body 2 can be distinguished into a pre-discharge processing region R1, a discharge region R2, post-discharge processing regions R3 and R4, a transfer region R5, and a post-transfer processing region R6. The transfer body 2 cyclically passes through the regions.

The pre-discharge processing region R1 is a region in which the transfer body 2 is preprocessed before ink discharge performed by the printing unit 3 and is a region in which the peripheral unit 5A performs processing. In the case of the present embodiment, a reaction liquid is applied. The discharge region R2 is a forming region in which the printing unit 3 discharges the ink to the transfer body 2 to form an ink image. The post-discharge processing regions R3 and R4 are processing regions in which the ink image is processed after ink discharge, the post-discharge processing region R3 is a region in which the peripheral unit 5B performs processing, and the post-discharge processing region R4 is a region in which the peripheral unit 5C performs processing. The transfer region R5 is a region in which the transfer unit 4 transfers the ink image on the transfer body 2 to the print medium P. The post-transfer processing region R6 is a region in which the transfer body 2 is post-processed after transfer and is a region in which the peripheral unit 5D performs processing.

In the case of the present embodiment, the discharge region R2 is a region having a certain section. The sections of the other regions R1 and R3 to R6 are shorter than the section of the discharge region R2. In the case of the present embodiment, in the case of being compared to a dial on a clock, the pre-discharge processing region R1 is approximately at ten o'clock, the discharge region R2 is approximately from eleven o'clock to one o'clock, the post-discharge processing region R3 is approximately at two o'clock, and the post-discharge processing region R4 is approximately at four o'clock. The transfer region R5 is approximately at six o'clock, and the post-transfer processing region R6 is approximately at eight o'clock.

The outer peripheral surface of the impression cylinder 42 is pressed against the transfer body 2. At least one grip mechanism for holding a tip of the print medium P is provided on the outer peripheral surface of the impression cylinder 42. A plurality of grip mechanisms may be provided separately from each other in the circumferential direction of the impression cylinder 42. In a case where the print medium P passes through a nip portion between the impression cylinder 42 and the transfer body 2 while being conveyed in close contact with the outer peripheral surface of the impression cylinder 42, the ink image on the transfer body 2 is transferred.

Both of the transfer drum 41 and the impression cylinder 42 have a common drive source such as a motor that drives the transfer drum 41 and the impression cylinder 42. A driving force can be distributed using a transmission mechanism such as a gear mechanism.

Peripheral Unit

The peripheral units 5A to 5D are arranged around the transfer drum 41. In the case of the present embodiment, the peripheral units 5A to 5D are an application unit, an absorption unit, a heating unit, and a cleaning unit, respectively.

The application unit 5A is a mechanism for applying the reaction liquid onto the transfer body 2 before the printing unit 3 discharges the ink. The reaction liquid is a liquid including a component that increases the viscosity of the ink. Here, an increase in the viscosity of the ink means that a coloring material, a resin, and the like forming the ink chemically react or physically adsorb by contacting the component that increases the viscosity of the ink, thereby resulting in the increase in the viscosity of the ink. The increase in the viscosity of the ink is shown not only in a case where an increase in the viscosity of the entire ink is observed, but also in a case where some of the components forming the ink such as a coloring material and a resin aggregate to cause a local increase in viscosity.

The component that increases the viscosity of the ink such as metal ions or polymer flocculants is not specifically limited, but a substance that causes a change in the pH of the ink and aggregates the coloring material in the ink can be used, and an organic acid can be used. Examples of a reaction liquid application mechanism include, for example, a roller, a print head, a die coating device (die coater), and a blade coating device (blade coater). In a case where the reaction liquid is applied to the transfer body 2 before the ink is discharged to the transfer body 2, the ink that has reached the transfer body 2 can be immediately fixed. This makes it possible to suppress bleeding caused by adjacent inks being mixed with each other.

The absorption unit 5B is a mechanism for absorbing a liquid component from the ink image on the transfer body 2 before transfer. Reducing the liquid component for the ink image can suppress bleeding or the like of an image to be printed on the print medium P. From a different viewpoint, a decrease in the liquid component can be expressed as concentrating the ink that forms the ink image on the transfer body 2. Concentrating the ink means that the liquid component included in the ink decreases, so that the content ratio of a solid content such as the coloring material and the resin included in the ink to the liquid component increases.

The absorption unit 5B includes, for example, a liquid absorption member that contacts the ink image to reduce the amount of the liquid component for the ink image. The liquid absorption member may be formed on an outer peripheral surface of the roller or may be formed in an endless sheet shape and moved cyclically. In terms of protection of the ink image, the liquid absorption member may be moved in synchronization with the transfer body 2 by causing the liquid absorption member to move at the same speed as the peripheral speed of the transfer body 2.

The liquid absorption member may include a porous body that contacts the ink image. In order to suppress ink solid adhesion to the liquid absorption member, the pore size of the porous body on a face in contact with the ink image may be 10 μm or less. Here, the pore size indicates an average diameter and can be measured by a publicly known means such as a mercury intrusion method, a nitrogen adsorption method, and SEM image observation. The liquid component is not specifically limited as long as the liquid component has no certain shape, has fluidity, and has a substantially constant volume. For example, examples of the liquid component include water, an organic solvent, and the like included in an ink or a reaction liquid.

The heating unit 5C is a mechanism for heating the ink image on the transfer body 2 before transfer. By heating the ink image, the resin in the ink image melts, and the transferability to the print medium P is improved. A heating temperature can be equal to or higher than the minimum filming temperature (MFT) of the resin. The MFT can be measured with a device compliant with a commonly known method such as JIS K 6828-2:2003 or ISO2115:1996. From the viewpoint of transferability and image fastness, heat may be applied at a temperature higher than the MFT by 10° C. or more, and may further be applied at a temperature higher than the MFT by 20° C. or more. As the heating unit 5C, a publicly known heating device such as various lamps using, for example, infrared rays and a hot air fan can be used. An infrared heater can be used in terms of heating efficiency.

The cleaning unit 5D is a mechanism for cleaning the transfer body 2 after transfer. The cleaning unit 5D removes an ink remaining on the transfer body 2, dust on the transfer body 2, and the like. The cleaning unit 5D may appropriately use a publicly known method such as a method of bringing a porous member into contact with the transfer body 2, a method of rubbing the surface of the transfer body 2 with a brush, or a method of scraping the surface of the transfer body 2 with a blade. Further, as a cleaning member used for cleaning, a cleaning member in a publicly known shape such as a roller shape or a web shape can be used.

As described above, in the present embodiment, the application unit 5A, the absorption unit 5B, the heating unit 5C, and the cleaning unit 5D are provided as peripheral units. However, some of the units may be provided with the function of cooling the transfer body 2 or with a cooling unit. In the present embodiment, the temperature of the transfer body 2 may rise due to the heat of the heating unit 5C. In a case where the temperature of the ink image exceeds the boiling point of water which is a main solvent for the ink after the printing unit 3 discharges the ink to the transfer body 2, there is a possibility that the absorption performance of the liquid component by the absorption unit 5B deteriorates. The transfer body 2 is cooled so that the discharged ink is maintained below the boiling point of water, so that the absorption performance of the liquid component can be maintained.

The cooling unit may be a blowing mechanism that blows air to the transfer body 2 or a mechanism that brings a member (e.g. a roller) into contact with the transfer body 2 and cools the member by air cooling or water cooling. Alternatively, the cooling unit may be a mechanism for cooling the cleaning member of the cleaning unit 5D. A cooling timing may be within a period after transfer and before the reaction liquid is applied.

Supply Unit

The supply unit 6 is a mechanism for supplying an ink to each print head 30 of the printing unit 3. The supply unit 6 may be provided on the rear side of the printing system 1. The supply unit 6 includes tank units TK that store an ink for each type of ink. Each tank unit TK may be formed of a main tank and a subtank. Each tank unit TK communicates with the corresponding print head 30 through a flow path 6a, and the ink is supplied from the tank unit TK to the print head 30. The flow path 6a may be a flow path that circulates the ink between the tank unit TK and the print head 30. The supply unit 6 may include a pump or the like that circulates the ink. In the middle of the flow path 6a or in the tank unit TK, a deaeration mechanism for deaerating bubbles in the ink may be provided. In the middle of the flow path 6a or in the tank unit TK, a valve may be provided to adjust the liquid pressure of the ink and atmospheric pressure. The height in the Z direction of the tank unit TK and the print head 30 may be designed so that an ink liquid surface in the tank unit TK is positioned lower than an ink discharge surface of the print head 30.

Conveying Device

The conveying device 1B is a device for feeding the print medium P to the transfer unit 4 and discharging the printed subject P' to which the ink image has been transferred from the transfer unit 4. The conveying device 1B includes a feeding unit 7, a plurality of conveyance cylinders 8, 8a, two sprockets 8b, a chain 8c and a recovery unit 8d. In FIG. 1, an arrow inside a figure of each feature of the conveying device 1B indicates a rotation direction of the feature, and an outer arrow shows a conveyance route of the print medium P or the printed subject P'. The print medium P is conveyed from the feeding unit 7 to the transfer unit 4, and the printed subject P' is conveyed from the transfer unit 4 to the recovery unit 8d. There is a case where a feeding unit 7 side is called an upstream side in the conveyance direction and where a recovery unit 8d side is called a downstream side.

The feeding unit 7 includes a loading portion where a plurality of print media P are loaded and includes a feeding mechanism for feeding the print medium P one by one from the loading portion to the most upstream conveyance cylinder 8. Each of the conveyance cylinders 8, 8a is a rotation body that rotates around the rotation axis in the Y direction and has an outer peripheral surface in a cylindrical shape. The outer peripheral surface of each conveyance body 8, 8a is provided with at least one grip mechanism for holding the tip of the print medium P (or the printed subject P'). The grip operation and releasing operation of each grip mechanism are controlled so that the print medium P is delivered between adjacent conveyance cylinders.

The two conveyance cylinders 8a are conveyance cylinders for reversal of the print medium P. In a case where both sides of the print medium P are printed, after transfer to a front surface is performed, the print medium P is not passed from the pressure cylinder 42 to the conveyance cylinder 8 adjacent to the downstream side of the pressure cylinder 42 but is passed to the conveyance cylinder 8a. The print medium P is reversed upside down via the two conveyance cylinders 8a and is passed again to the pressure cylinder 42 via the conveyance cylinder 8 on the upstream side of the pressure cylinder 42. As a result, the back surface of the print medium P faces the transfer drum 41, and the ink image is transferred to the back surface.

The chain 8c is wound between the two sprockets 8b. One of the two sprockets 8b is a drive sprocket and the other is a driven sprocket. The rotation of the drive sprocket moves the chain 8c cyclically. The chain 8c is provided with a plurality of grip mechanisms separately in the longitudinal direction of the chain 8c. Each grip mechanism grips the end of the printed subject P'. The printed subject P' is passed to the grip mechanism of the chain 8c from the conveyance cylinder 8 located at a downstream end. The printed subject P' gripped by the grip mechanism is conveyed to the recovery unit 8d by the movement of the chain 8c, and the grip is released. As a result, the printed subject P' is loaded in the recovery unit 8d.

Post-Processing Unit

The conveying device 1B is provided with post-processing units 10A, 10B. The post-processing units 10A, 10B are arranged downstream from the transfer unit 4 and are mechanisms for performing post-processing on the printed subject P'. The post-processing unit 10A performs processing on the front surface of the printed subject P' and the post-processing unit 10B performs processing on the back surface of the printed subject P'. Examples of the contents of the processing may include, for example, a coating on an image print surface of the printed subject P' for the purpose of protecting, glossing, and the like of the image. Examples of the contents of the coating may include, for example, liquid application, sheet welding, lamination, and the like.

Inspection Unit

The conveying device 1B is provided with inspection units 9A, 9B. The inspection units 9A, 9B are arranged downstream from the transfer unit 4 and are mechanisms for performing an inspection for the printed subject P'.

In the case of the present embodiment, the inspection unit 9A is a photographing device that photographs an image printed on the printed subject P' and includes, for example, an image capturing element such as a CCD sensor and a CMOS sensor. The inspection unit 9A photographs a printed image during a print operation which is performed continuously. Based on the image photographed by the inspection unit 9A, it is possible to check a temporal variation in the color of the printed image or the like and determine whether the image data or print data can be corrected. For the inspection unit 9A in the present embodiment, an image capturing range in which the entire surface of the printed subject P' can be photographed is set.

In the case of the present embodiment, the inspection unit 9B is also a photographing device that photographs an image printed on the printed subject P' and includes, for example, an image capturing element such as the CCD sensor and the CMOS sensor. The inspection unit 9B photographs a printed image during a test print operation. The inspection unit 9B can photograph the entire printed image and can make a basic setting of various types of corrections relating to print data based on the image photographed by the inspection unit 9B. In the case of the present embodiment, the inspection unit 9B is arranged in a position where the printed subject P' conveyed by the chain 8c is photographed. In a case where the inspection unit 9B photographs the printed image, the movement of the chain 8c is temporally stopped to photograph the whole printed image. The inspection unit 9B may be a scanner that performs a scan on the printed subject P'.

Control Unit

Figure 4:
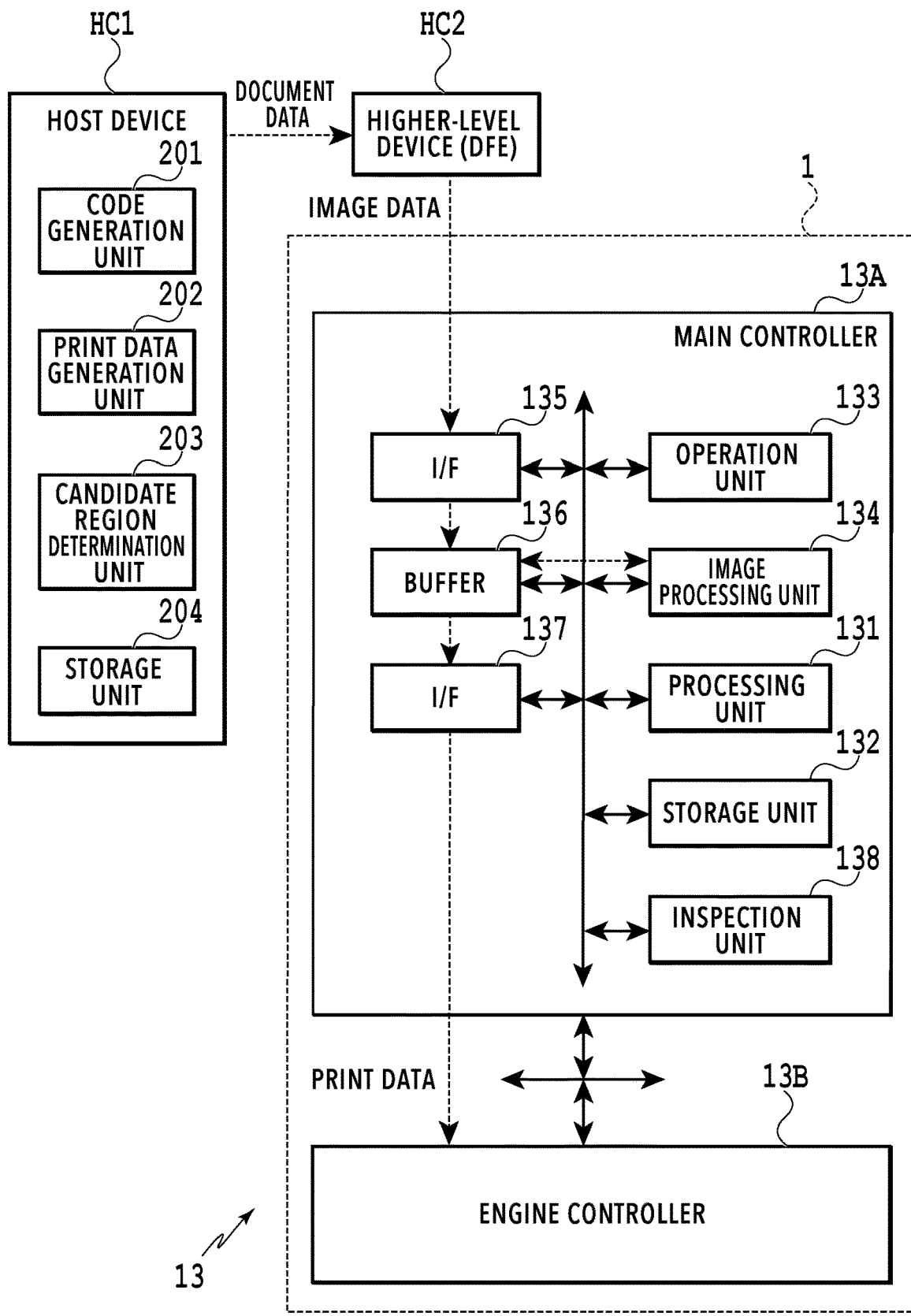
FIG. 4 is a block diagram of a control system of the printing system.
Figure 5:
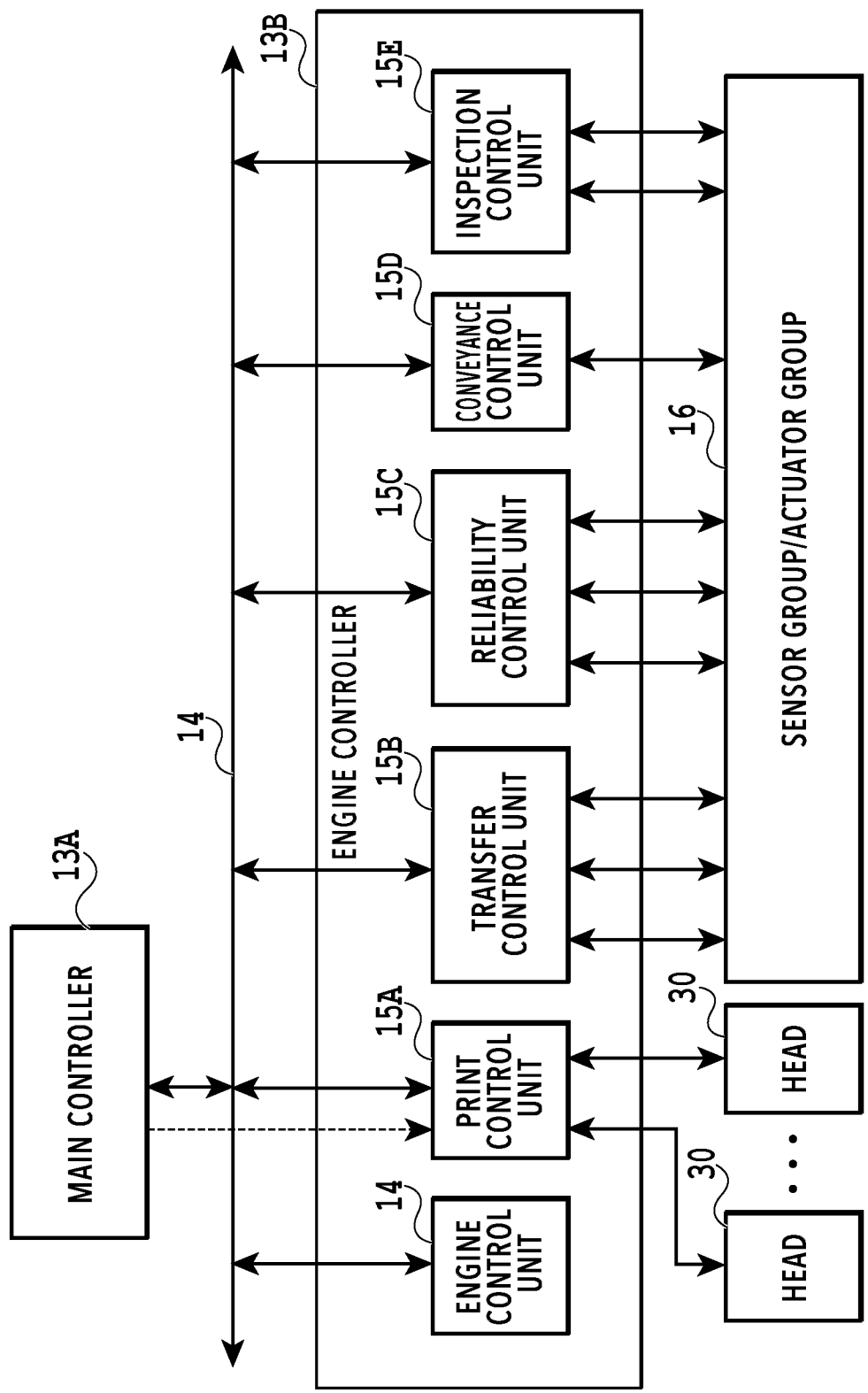
FIG. 5 is a block diagram of the control system of the printing system.

Next, a control unit in the printing system 1 will be described below. FIG. 4 and FIG. 5 are block diagrams of a control unit 13 in the printing system 1. The control unit 13 is communicably connected to a higher-level device (DFE) HC2, and the higher-level device HC2 is communicably connected to a host device HC1.

In the host device HC1, document data which is the original of the printed image is generated or saved. The document data here is generated in the format of an electronic file such as a document file or an image file. At the time of the generation of the document data, an inspection code to be used for an inspection in a case where the document data is printed is embedded together in the document data which is to be a product. A method of embedding the code will be described in detail in an embodiment to be described below.

The document data is transmitted to the higher-level device HC2, and in the higher-level device HC2, the received document data is converted into a data format (e.g. RGB data expressing an image in RGB) which can be used by the control unit 13. The converted data is transmitted as image data to the control unit 13 from the higher-level device HC2 and the control unit 13 starts a print operation based on the received image data.

In the case of the present embodiment, the control unit 13 is broadly divided into a main controller 13A and an engine controller 13B. The main controller 13A includes a processing unit 131, a storage unit 132, an operation unit 133, an image processing unit 134, a communication I/F (interface) 135, a buffer 136, a communication I/F 137, and an inspection unit 138.

The processing unit 131 is a processor such as a CPU, executes a program stored in the storage unit 132, and controls the entire main controller 13A. The storage unit 132 is a storage device such as a RAM, a ROM, a hard disk, an SSD, and the like, stores a program executed by a CPU 131 and data, and provides the CPU131 with a work area. The operation unit 133 is an input device such as a touch panel, a keyboard, and a mouse and accepts user instructions.

The image processing unit 134 is an electronic circuit having an image processing processor, for example. The buffer 136 is, for example, a RAM, a hard disk, or an SSD. The communication I/F 135 communicates with the higher-level device HC2 and the communication I/F 137 communicates with the engine controller 13B. In FIG. 4, a dashed arrow shows an example of the flow of image data processing. The image data received from the higher-level device HC2 via the communication I/F 135 is accumulated in the buffer 136. The image processing unit 134 reads the image data from the buffer 136, applies predetermined image processing to the read image data, and stores the data again in the buffer 136. The image data after image processing stored in the buffer 136 is transmitted from the communication I/F 137 to the engine controller 13B as print data used by a print engine.

Figure 9:
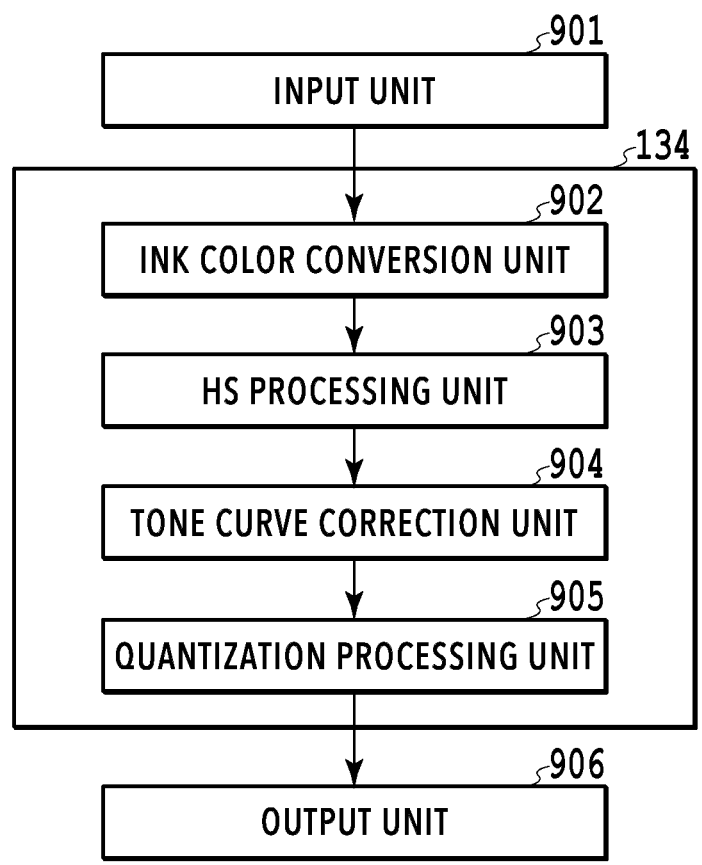
FIG. 9 is a flow chart illustrating processing in an image processing unit.

FIG. 9 is a flow chart illustrating processing in the image processing unit 134.

The input unit 901 receives input of the image data transmitted from the buffer 136 and passes the image data to the image processing unit 134. The image processing unit 134 includes an ink color conversion processing unit 902, an HS (Head Shading) processing unit 903, a tone curve correction unit 904, and a quantization processing unit 905.

The input unit 901 receives input of the RGB data from the higher-level device HC2. The input RGB data includes 8-bit image data, (R, G, B), in a color reproduction region of the printing apparatus 1A, and the resolution is 600 dpi.

The ink color conversion processing unit 902 converts input 8-bit image data for each (R, G, B) into image data in the ink used in the printing apparatus 1A. The printing apparatus 1A of the present embodiment uses a cyan ink (C), a magenta ink (M), a yellow ink (Y), and a black ink (K), and the image data including a signal value RGB is converted into image data including 8-bit color signals in CMYK. The color conversion is performed by a known method such as matrix operational processing or processing with a three-dimensional look-up table. In the present embodiment, the three-dimensional look-up table and interpolation calculation are used in combination to perform conversion processing. Alternatively, the processing at the ink color conversion processing unit 902 may be executed before input into the input unit 901. In this case, the 8-bit image data for each K, C, M, and Y is input into the input unit 901.

The HS (Head Shading) processing unit 903 receives input of the 8-bit color signal for each K, C, M, and Y and converts 8-bit data for each ink color into image data on an ink color signal depending on a characteristic such as a discharge amount from each nozzle forming the print head. This causes conversion into image data to perform uniform printing according to uneven density caused by a characteristic such as a discharge amount from each nozzle. In the present embodiment, processing is performed using a one-dimensional look-up table.

The tone curve correction unit 904 adjusts the number of dots to be printed by the output unit 906 for each ink color with respect to the image data formed of each HS-processed 8-bit ink color signal. There is a case where a relationship between the number of dots to be printed on the print medium and a lightness does not become linear, and the tone curve correction unit 904 corrects respective 8-bit image data so that the relationship becomes linear and adjusts the number of dots to be printed on the print medium.

The quantization processing unit 905 performs quantization processing of image data in each 8-bit ink color processed by the tone curve correction unit 904 to obtain 1-bit binary data. At this time, in the present embodiment, first, conversion into 0 to 4 of index data for each ink color of 3 bits and quinary is made. The index data 0 to 4 corresponds to a pattern in which 0 to 4 dots are arranged in 2 pixels×2 pixels with a resolution of 1200 dpi. The mode of the quantization processing unit 905 is not limited to the above example. For example, the 8-bit image data may be directly binarized to obtain the presence or absence of ink discharge. Further, although a dither method is used as a quantization processing method in the present embodiment, another quantization method such as an error diffusion method may be used.

Based on dot data obtained by the quantization, the output unit 906 drives the print head and discharges an ink in each color to the print medium to perform printing. Specifically, the output unit 906 includes the printing system 1 shown in FIG. 1. The inspection unit 138 is an inspection processing unit that inspects the printed subject P'.

Figure 10:
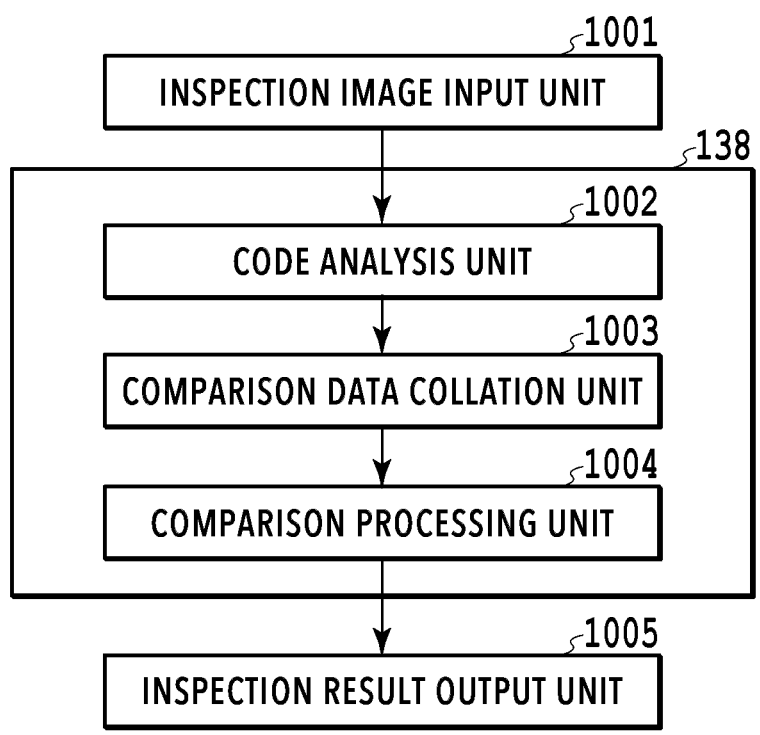
FIG. 10 is a flow chart illustrating processing in an inspection unit.

FIG. 10 is a flow chart illustrating processing in the inspection unit 138. An inspection image input unit 1001 inputs an image (hereinafter referred to as an inspection image) photographed by the above-described inspection unit 9A into the inspection unit 138. The inspection image is an image obtained by photographing the printed subject P' to be inspected.

A code analysis unit 1002 obtains an inspection code region from the input inspection image and performs an analysis. The code region may be obtained using an existing technique such as pattern matching. The code analysis is performed using a predetermined existing technique pursuant to a code standard. Then, information indicated by a number or a letter of the alphabet embedded in the code is obtained. The information indicates an identifier of the document data on the printed subject P' to be inspected.

A comparison data collation unit 1003 uses the information obtained by the code analysis unit 1002 to obtain the document data on the printed subject P' to be inspected. Then, after performing predetermined image processing on each of the inspection image and the document data, comparison is made to determine that a region in which a difference equal to or greater than a preset criterion is detected is defective. The comparison may be made by, for example, calculating a difference between the signal values of corresponding pixels of the inspection image and the document data, or calculating a feature quantity including a color and a shape to calculate a difference between corresponding regions. Alternatively, a defect region may be determined by inputting the inspection image and the document data into a learning model which has been machine-learned in advance without setting the preset criterion.

An inspection result output unit 1005 displays an inspection result on a display screen such as a monitor (not shown) in order to convey the inspection result to a person who operates the printing system 1. If necessary, the inspection result is transmitted to the host device HC1, the storage unit 132, the engine controller 13B, and the like.

As shown in FIG. 5, the engine controller 13B includes the control units 14 and 15A to 15E, obtains detection results of a sensor group and actuator group 16 included in the printing system 1, and performs drive control. Each of the control units includes a processor such as a CPU, a storage device such as a RAM or a ROM, and an interface with an external device. Incidentally, the division of the control units is an example. A portion of control may be executed by a plurality of further subdivided control units. Conversely, the plurality of control units may be integrated to perform the contents of the control by one control unit.

An engine control unit 14 controls the entire engine controller 13B. The print control unit 15A converts the print data received from the main controller 13A into a data format suitable for driving the print head 30, such as raster data. The print control unit 15A controls the discharge of each print head 30.

A transfer control unit 15B controls the application unit 5A, the absorption unit 5B, the heating unit 5C, and the cleaning unit 5D.

A reliability control unit 15C controls the supply unit 6, the recovery unit 12, and the drive mechanism for moving the printing unit 3 between a discharge position POS1 and a recovery position POS3.

A conveyance control unit 15D controls the drive of the transfer unit 4 and the conveying device 1B.

An inspection control unit 15E controls the inspection unit 9B and the inspection unit 9A.

The sensor group of the sensor group and actuator group 16 includes a sensor for detecting the position and speed of a movable portion, a sensor for detecting a temperature, an image capturing element, and the like. The actuator group includes a motor, an electromagnetic solenoid, an electromagnetic valve, and the like.

Operation Example

Figure 6:
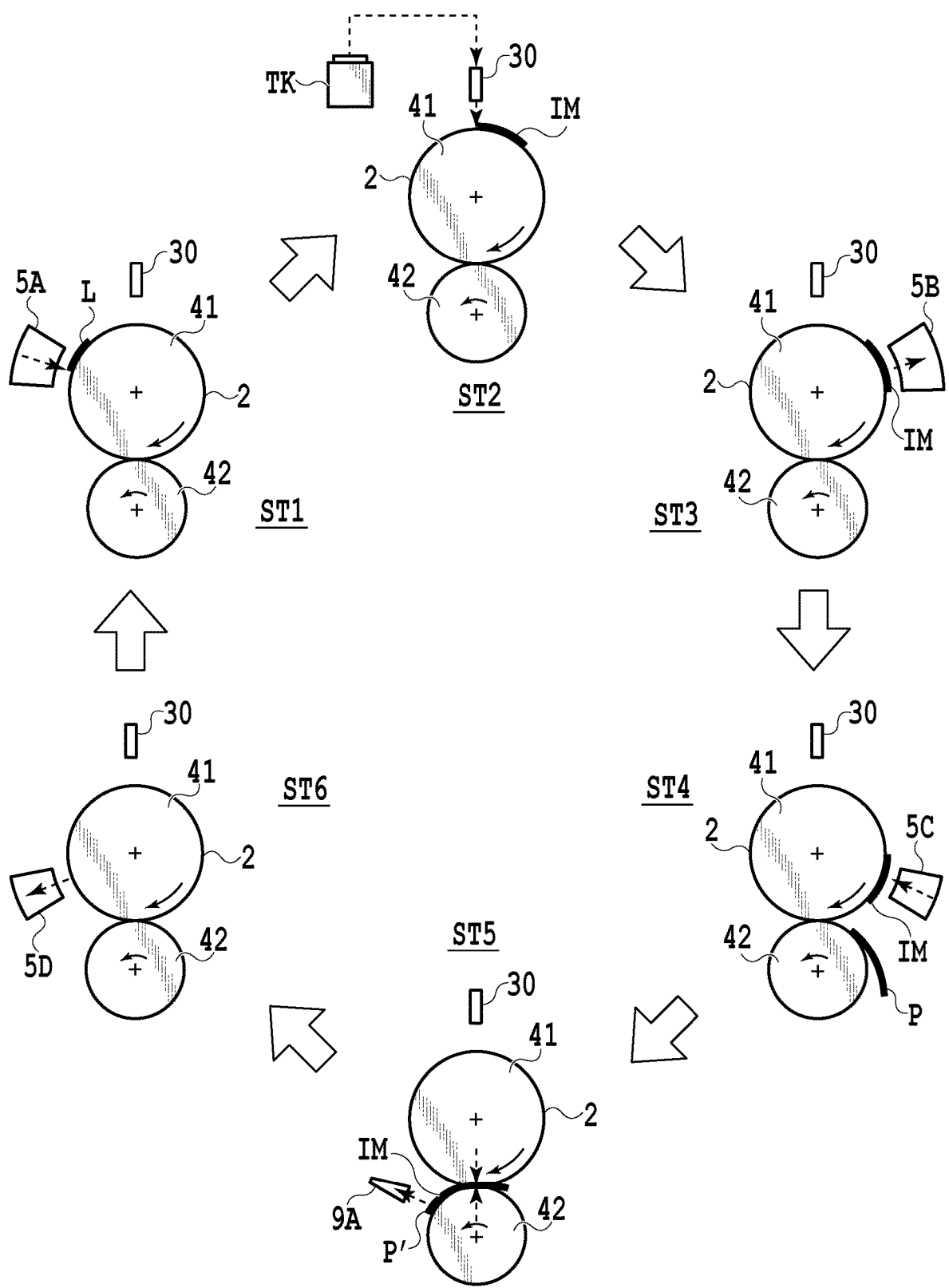
FIG. 6 is an explanatory diagram of an operation example of the printing system.

FIG. 6 is a diagram schematically showing an example of a print operation. While the transfer drum 41 and the impression cylinder 42 are rotated, the following steps are cyclically performed. As shown in a state ST1, a reaction liquid L is first applied onto the transfer body 2 from the application unit 5A. The portion on the transfer body 2 to which the reaction liquid L is applied moves along with the rotation of the transfer drum 41. In a case where the portion to which the reaction liquid L is applied reaches below the print head 30, an ink is discharged from the print head 30 to the transfer body 2 as shown in a state ST2. As a result, an ink image IM is formed. At that time, the discharged ink mixes with the reaction liquid L on the transfer body 2, thereby promoting the aggregation of the coloring material. The discharged ink is supplied to the print head 30 from the tank unit TK in the supply unit 6.

The ink image IM on the transfer body 2 moves along with the rotation of the transfer body 2. In a case where the ink image IM reaches the absorption unit 5B, the liquid component is absorbed from the ink image IM by the absorption unit 5B as shown in a state ST3. In a case where the ink image IM reaches the heating unit 5C, the ink image IM is heated by the heating unit 5C as shown in a state ST4, a resin in the ink image IM melts, and the ink image IM is filmed. The print medium P is conveyed by the conveying device 1B in synchronization with the formation of the ink image IM.

As shown in a state ST5, the ink image IM and the print medium P reach the nip portion between the transfer body 2 and the impression cylinder 42, the ink image IM is transferred to the print medium P, and the printed subject P' is produced. In the case of passing through the nip portion, the image printed on the printed subject P' is photographed by the inspection unit 9A, and the printed image is inspected. The printed subject P' is conveyed to the recovery unit 8d by the conveying device 1B.

In the case of reaching the cleaning unit 5D, the portion on the transfer body 2 where the ink image IM is formed is cleaned by the cleaning unit 5D as shown in a state ST6. As a result of cleaning, the transfer body 2 has made one rotation, and the ink image is repeatedly transferred to the print medium P through the same procedure. In the above description, to facilitate understanding, the description has been made so that the ink image IM is transferred to one print medium P once by one rotation of the transfer body 2. However, one rotation of the transfer body 2 enables continuous transfer of the ink image IM to a plurality of print media P.

Figure 7:
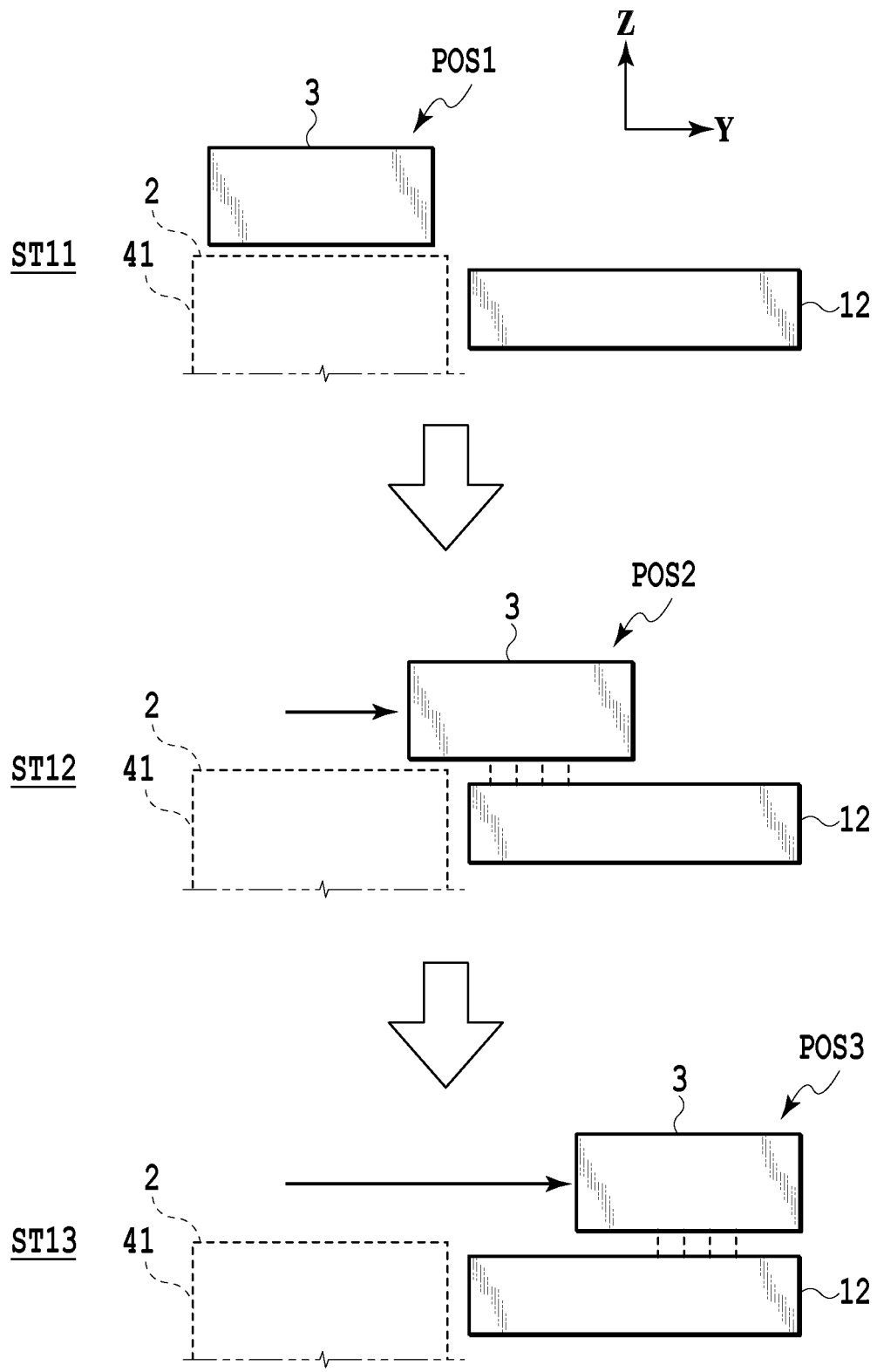
FIG. 7 is an explanatory diagram of an operation example of the printing system.

The continuation of such a print operation results in the need for maintenance of each print head 30. FIG. 7 shows an operation example during the maintenance of each print head 30. A state ST11 indicates a state where the printing unit 3 is located in the discharge position POS1. A state ST12 indicates a state where the printing unit 3 passes a preliminary recovery position POS 2, and during the passage, the recovery unit 12 executes a process of recovering the discharge performance of each print head 30 of the printing unit 3. After that, as shown in a state ST13, with the printing unit 3 located in the recovery position POS 3, the recovery unit 12 executes the process of recovering the discharge performance of each print head 30.

Document Data Generation

A system configuration of the host device HC1 in the present embodiment will be described with reference to FIG. 4. The host device HC1 has a code generation unit 201, a print data generation unit 202, a candidate region determination unit 203, and a storage unit 204. The code generation unit 201 generates an inspection code. The print data generation unit 202 synthesizes the code generated by the code generation unit 201 and the imposition data in which an image is imposed in the print region. That is, the code is embedded in the imposition data. The candidate region determination unit 203 determines a position where the inspection code is embedded. The storage unit 204 is a storage device such as a RAM, a ROM, a hard disk, an SSD, or the like and stores a program or data executed by the CPU of the host device HC1 or provides the CPU with a work area.

Figure 11:
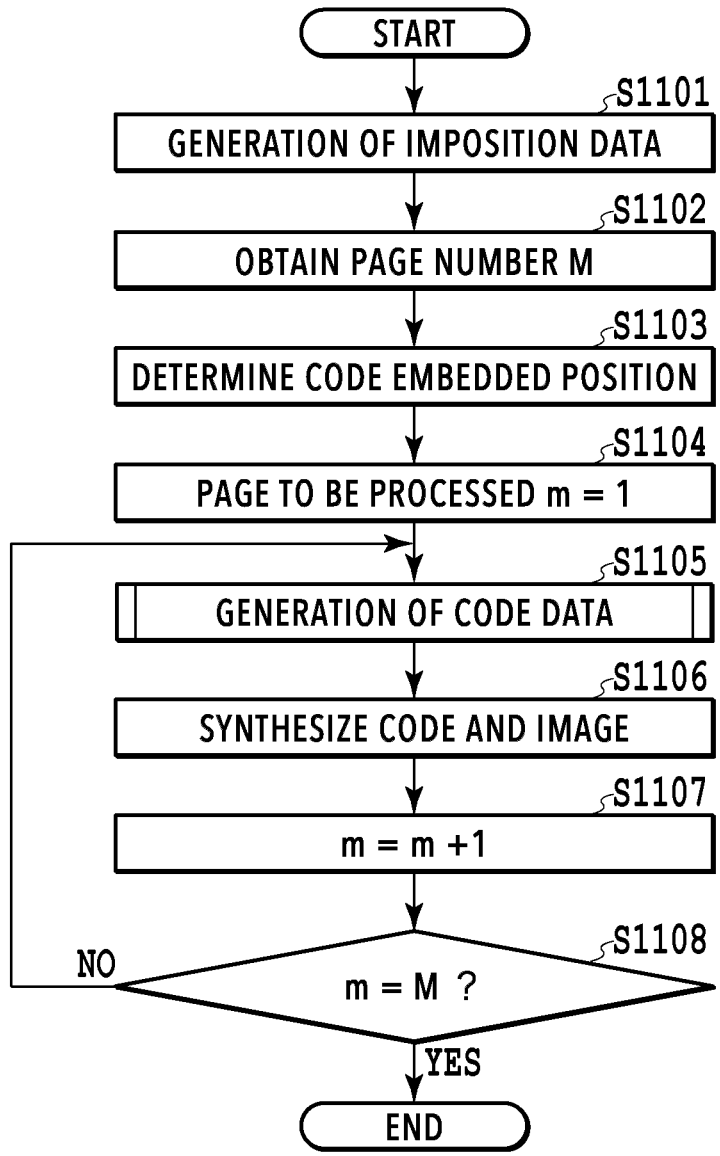
FIG. 11 is a flow chart of document data generation processing.

FIG. 11 is a diagram illustrating a procedure for document data generation processing performed by the host device HC1 in the present embodiment. The procedure is processing executed by the code generation unit 201, the print data generation unit 202, or the candidate region determination unit 203 included in the host HC1. That is, the procedure is implemented by the CPU of the host device HC1 expanding the program stored in the ROM of the host device HC1 into the RAM and executing the program. A symbol "S" in a description of each process means a step in the procedure.

In S1101, imposition data on an image to be printed is generated in the host device HC1. Then, the generation of imposition data will be described.

Figure 12:
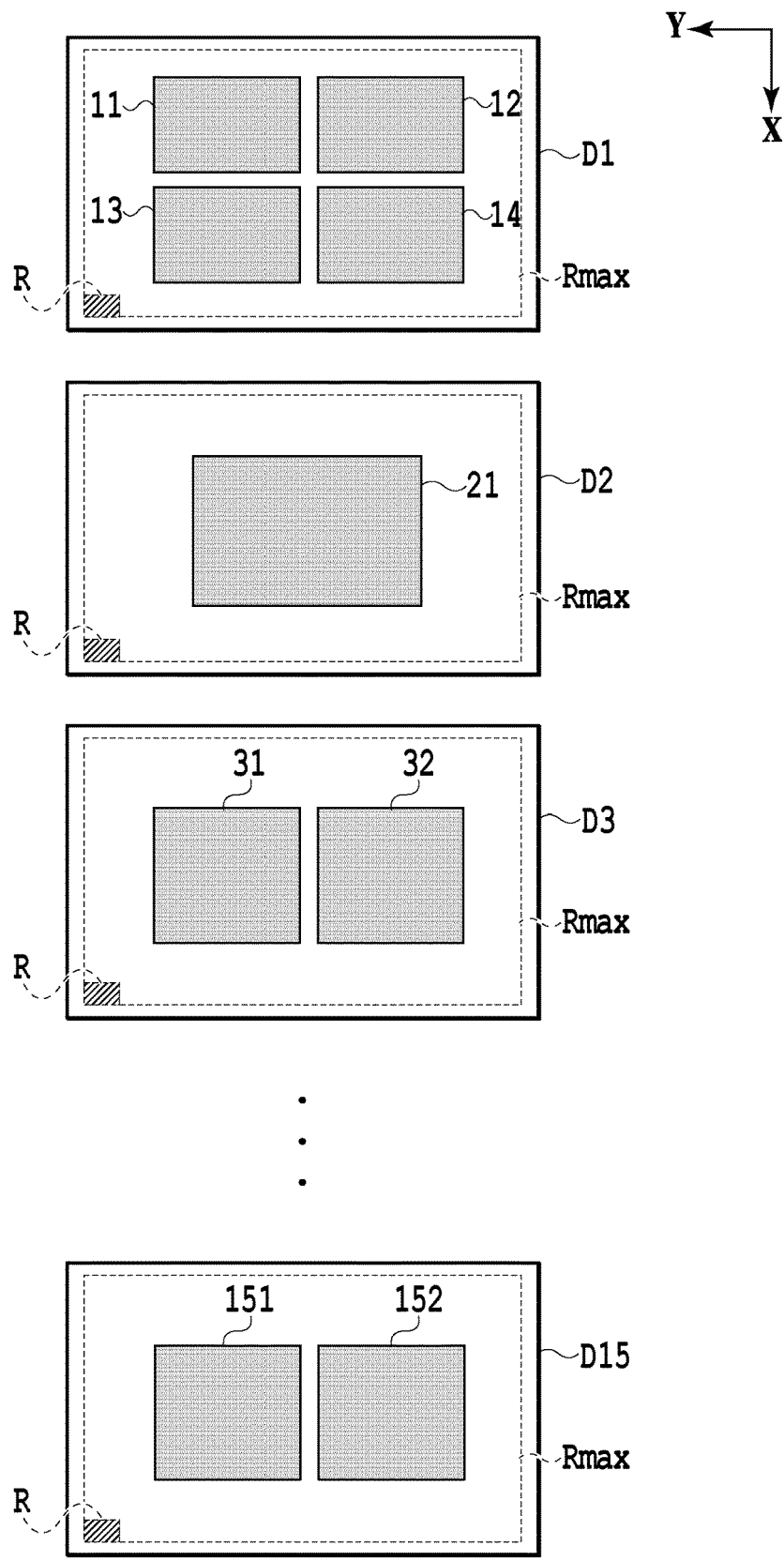
FIG. 12 is an example of imposition data.

FIG. 12 is an example of the imposition data generated in the present embodiment. The imposition data is data in which one or more images are pasted on one page as shown by D1 to D15 in FIG. 12. One inspection code is embedded in one page of the imposition data. The embedded code includes information on the document data to be compared at the time of inspecting the quality of the imposition data, and the imposition data and the document data are associated with each other using the embedded code. In the example, four images, an image 11, an image 12, an image 13, and an image 14, are arranged and imposed in data D1 on the first page in the same size. The images imposed on one page may be identical to or different from each other. The first page on which the image 11, the image 12, the image 13, and the image 14 are imposed is divided into four so that the imposition data on each image remains before or after comparison with the document data for inspection. The other pages are also cut so that only an imposition data portion remains. Only an image 21 is imposed in the center of data D2 on a second page. An image 31 and an image 32 are imposed in data D3 on a third page. The last page is a fifteenth page, and an image 151 and an image 152 are imposed in data D15 on the fifteenth page. Here, the longitudinal and lateral sizes of the data D1, D2, D3 . . . D15 are the sizes of the print medium P loaded on the feeding unit 7.

The description returns to FIG. 11. In S1102, the host device HC1 obtains a page number M of the imposition data. In the present embodiment, M=15 as shown in FIG. 12. In S1103, the host device HC1 determines the position of a code embedded region R. In consideration of the region of the image arranged on each page in the imposition data, it is determined that the code embedded region R is the same region, on each page, which does not overlap with any image. Further, it is desirable that the size of the code embedded region R include a size recommended for each code standard to be described later. Shaded regions on each page in the imposition data in FIG. 12 are the code embedded regions R in the present embodiment. It can be seen that the region is determined to be a region which is within the printable region Rmax unique to the printing apparatus and does not overlap with the images arranged on each page.

In S1104, the host device HC1 sets a page to be processed such that m=1 and starts a process of embedding the inspection code in a document on the first page.

In S1105, the host device HC1 generates data on the inspection code to be embedded in the data D1 on the first page. Information which is the basis of a code to be generated is based on an identification value of an mth page (a page to be processed). The identification value is identification information indicating original image data to be compared on each page, such as a name that identifies an image itself or an address on the storage unit 132 that stores information. Further, as described above, in the case of the imposition data in which a plurality of images are pasted on one page, one identification value can be meta information for the information on the plurality of imposed images. Further, for example, four images are imposed in the D1. This means that data in which four images are imposed has one identification value. It is desirable that the identification value of each page secure the number of digits in consideration of the number of pages of the imposition data generated in S1101. For example, since the number of pages M of the imposition data in the present embodiment is 15, an at-least-two-digit identification value should be secured. Further, for example, an identification value of the data D1 on the first page is preferably "01." Alternatively, an expected maximum number of pages of a job to be transmitted to the printing apparatus 1A may be secured to set the value to, for example, 6 digits "000001." In the present embodiment, the identification value of the data D1 on the first page is set to "000001." As a method of converting the identification value "000001" of the data D1 on the first page into a code, the NW-7 standard is used in the present embodiment. The NW-7 is a typical code standard with which a numerical value and a predetermined symbol can be coded. The code standard is not limited to the NW-7, and ITF (Interleaved Two of Five), CODE39, CODE128, or the like may be used. Constraints such as limitations on a symbol, a letter of the alphabet, or the number of digits which can be used in addition to numerical values differ depending on a standard to be used. It is desirable to make a selection appropriately according to the contents and size of information to be included in the code. Further, a QR code (registered trademark), which is a two-dimensional code, may be selected instead of the one-dimensional code as described above. In any case, it is preferable that the size of a code to be created satisfy a size recommended by each standard. A method of generating code data will be described later with reference to FIG. 13.

In S1106, the host device HC1 synthesizes the data D1 and the code so as to embed the code generated in S1105 in the data D1 on page m=1, that is, on the first page. In S1107, the host device HC1 performs setting such that m=m+1 and starts the process of embedding the inspection code in the second page.

In S1108, the host device HC1 determines whether the value of m which is the number of a page to be processed has reached the number of obtained pages M. That is, whether the processing for 15 pages is completed is checked. Since this step is a step in which processing on the second page has started, the process returns to S1105 and a code to be embedded in the second page is generated. The code to be embedded in the second page is generated from the identification value "000002" in the data D2 on the second page in FIG. 12. Similarly, the process of embedding a code in each page in the document data is repeated until m=15.

In S1108, the host device HC1 ends the procedure in a case where it is determined that m=M, that is, the processing on every obtained page has been completed. In the processes so far, one code can be embedded in each of 15 pages in the imposition data.

Figure 13:
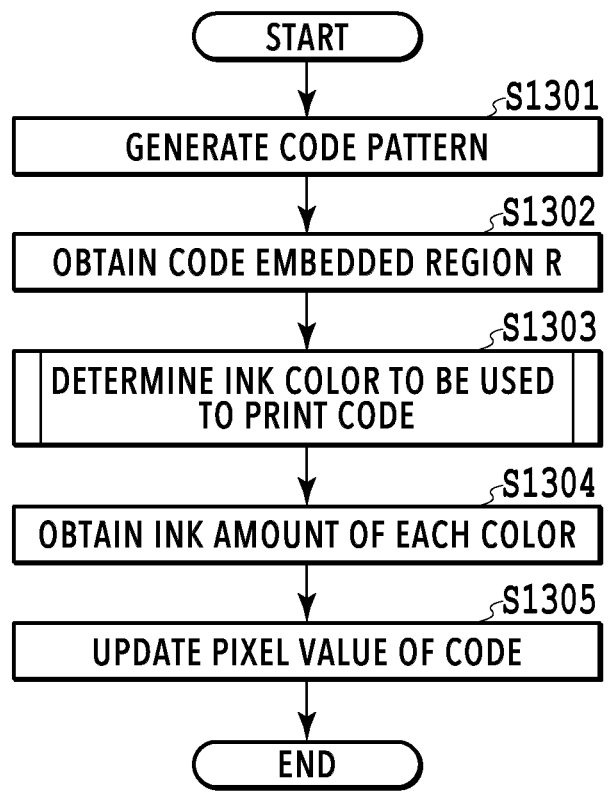
FIG. 13 is a diagram showing a procedure for code data generation.

Next, a description will be given of a method of generating code data in S1106 in FIG. 11. FIG. 13 is a diagram showing a procedure for code data generation. The procedure is implemented by the CPU of the host device HC1 expanding the program stored in the ROM of the host device HC1 into the RAM and executing the program.

In S1301, the host device HC1 generates a code pattern. As described above, the code is generated so as to have an identification value including information on original image data to be compared. In S1302, the host device HC1 obtains the code embedded region R predetermined in S1103. In S1303, the host device HC1 determines an ink color to be used to print the code.

Figure 14:
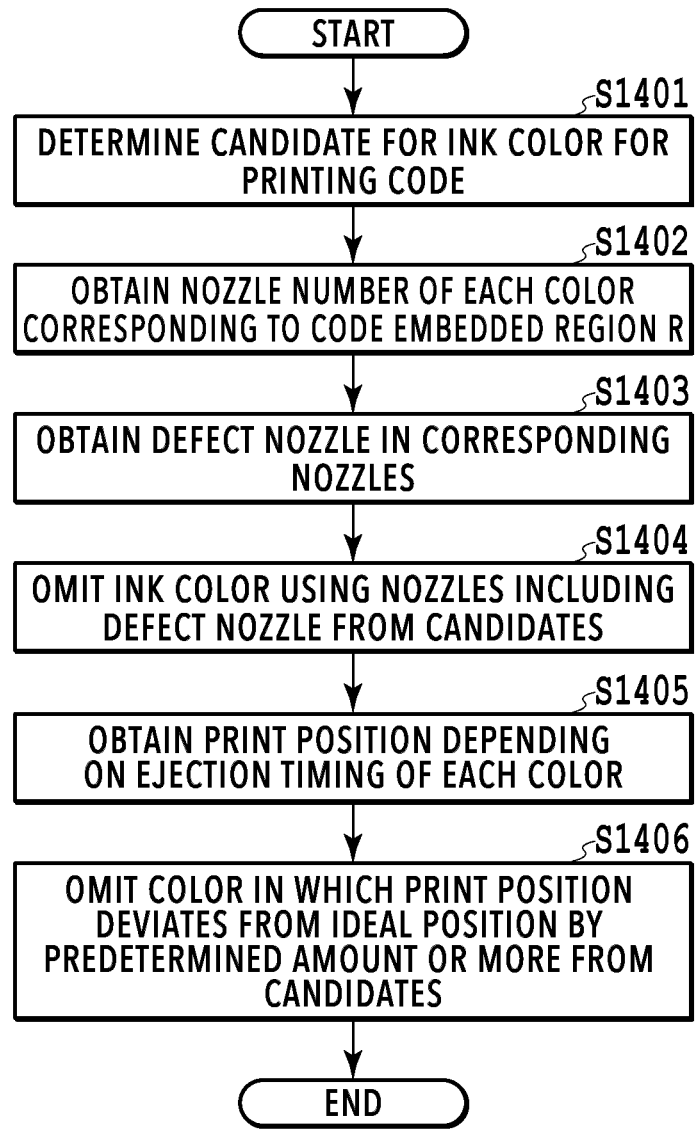
FIG. 14 is a diagram showing a procedure for determining an ink color to be used to print a code.

FIG. 14 is a diagram showing a procedure for determining an ink color to be used to print the code by the host device HC1. In S1401, the host device HC1 determines a plurality of ink color candidates to be used to print the code. In the present embodiment, the following three inks are candidates: the cyan ink, the magenta ink, and the yellow ink which are some of ink colors which can be printed by the printing apparatus 1A. In S1402, the host device HC1 obtains a nozzle number for each color corresponding to the code embedded region R.

FIGS. 15A and 15B are diagrams illustrating a printing nozzle corresponding to the position of the code embedded region R. FIG. 15A is made such that relative positions in the Y direction of the nozzle alignments of the plurality of print heads 30 illustrated in FIG. 8 and the data D1 on the first page in the imposition data illustrated in FIG. 12 are aligned with each other. In the present embodiment, the plurality of print heads 30 include a print head 30C that discharges the cyan ink, a print head 30M that discharges the magenta ink, and a print head 30Y that discharges the yellow ink. Additionally, as for the discharge substrates 301, 302, 303, 304 . . . , for example, discharge substrates 301C, 302C, 303C, 304C . . . are lined up on the print head 30C respectively. The same applies to the print heads 30M and 30Y.

FIG. 15B is an enlarged view of the discharge substrates 301C, 301M, and 301Y. A nozzle group N indicated by a thick dashed line is a set of printing nozzles used to print the code embedded region R. The positions in the Y direction of the nozzle group N and the region R are identical to each other. What is obtained in S1402 is information specifying the nozzle group N. The nozzle group N is obtained using a discharge substrate number such as 301C, 301M, and 301Y, array numbers from an array a to an array h, and nozzle numbers assigned in order from the left in the Y direction. In S1402 of the present embodiment, four nozzles from a first nozzle to a fourth nozzle are obtained for each of the nozzle arrays a to h in the discharge substrates 301C, 301M, and 301Y. The nozzles can be obtained according to coordinates on the image in the code embedded region R.

The description returns to FIG. 14. In S1403, in a case where the nozzle group N includes a known defective nozzle, the host device HC1 obtains the known defective nozzle. As an example of a method of obtaining a defective region, the storage unit 132 in the printing apparatus 1A previously stores information on the defective region for each printed subject P' detected by the inspection unit 138. In a case where from the accumulated information on the defect region, defects are continuously detected in positions that roughly match in the Y direction for each printed subject P', it is determined that nozzles at the positions in the Y direction have trouble, and the printing apparatus 1A transmits the information on the nozzles determined to have trouble to the host device HC1. In the present embodiment, as illustrated in FIG. 15B, there is ink stain D that inhibits ink discharge on the discharge substrate 301Y, which has a nozzle for the yellow ink. A total of four nozzles, the first and second nozzles in the nozzle array a and the first and second nozzles in the nozzle array b, where the ink stain D inhibits discharge, are stored as defective nozzles. The host device HC1 obtains this from the printing apparatus 1A.

In S1404, the host device HC1 omits ink colors using nozzles including the defective nozzles from the candidates. The ink color candidates are the three colors of the cyan ink, the magenta ink, and the yellow ink determined in S1401, and in the present embodiment, since the defect nozzles have been obtained for the yellow ink in S1403, the yellow ink is omitted from the candidates. As a result, the ink color candidates for printing the code are the following two colors: the cyan ink and the magenta ink. As described above, omitting a known defective nozzle from candidates reduces possibilities that the code is printed with the defective nozzle. Thus, the possibility of reading the code accurately at the time of inspection further increases.

In S1405, the host device HC1 obtains from the printing apparatus 1A a printing position caused by a deviation in the discharge timing of each color. The deviation is caused by a deviation in the printing position by a predetermined value or more due to a deviation in the discharge timing from an ideal timing. As for deviation information, the printing apparatus 1A records an ink color in which a deviation has occurred by an amount exceeding a predetermined allowable deviation amount in the past print operation, and the host device HC1 in S1405 obtains the above deviation information from the printing apparatus 1A.

In S1406, the host device HC1 omits the ink color obtained in S1405 from the candidates. As described above, omitting from candidates a color in which a printing position deviates from an ideal position by a predetermined value or more reduces possibilities that the inks of respective colors which must be overlapped and printed are printed while being deviated relatively largely. This further increases the possibility of reading the code accurately at the time of inspection. In the present embodiment, the deviation amounts of the printing positions of both the cyan ink and the magenta ink which are ink candidates for printing the code are within the predetermined allowable deviation amount, and the two colors are kept as candidates. Then, the host device HC1 ends the procedure for determining the ink color to be used to print the code.

In this embodiment, priority is given to printing the code with a plurality of ink colors. Thus, in a case where a plurality of ink colors to be used for code printing do not remain, it is desirable not to omit a specific ink color from the candidates in S1404 and S1406 but to keep a plurality of ink colors for code printing.

The description returns to FIG. 13. In S1304, the host device HC1 obtains the ink amount of each color to be used to print the code from the printing apparatus 1A. The printing apparatus 1A predetermines the ink amount of each color using the following ink amount determination procedure.

Figure 16:
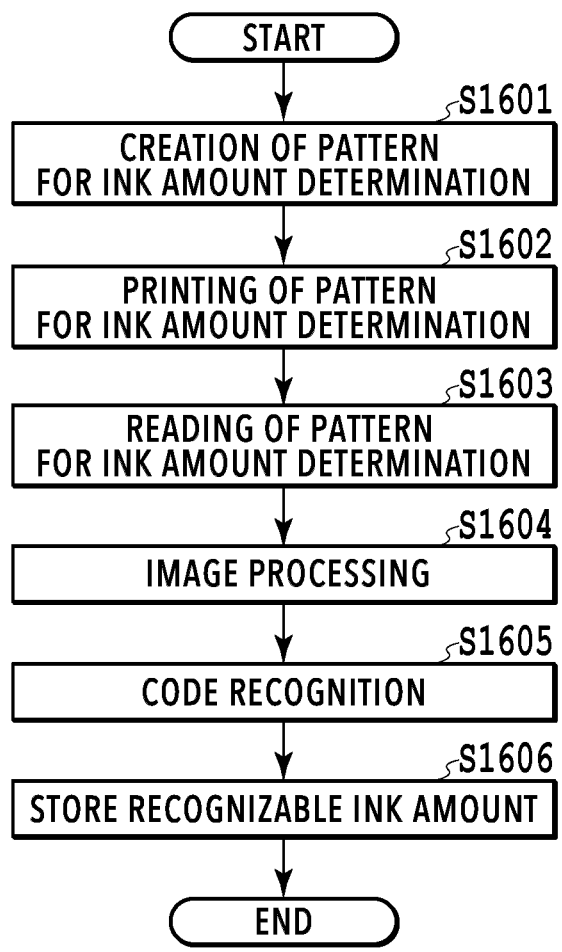
FIG. 16 is a flow chart for determining the ink amount of each color to be used to print the code.

FIG. 16 is a diagram showing a procedure through which the printing apparatus 1A determines the ink amount of each color to be used to print the code. The case of determining the amount of the cyan ink will be described as an example here. The procedure is implemented by the CPU expanding the program stored in the ROM included in the printing apparatus 1A into the RAM and executing the program.

In S1601, the printing apparatus 1A creates a pattern for ink amount determination. The pattern is image data for changing the ink amount of the cyan ink in multiple stages and printing a predetermined code in each ink amount. A pattern in which the amount of the cyan ink changes in multiple stages is created as follows with reference to a look-up table in FIG. 17.

Figure 18:
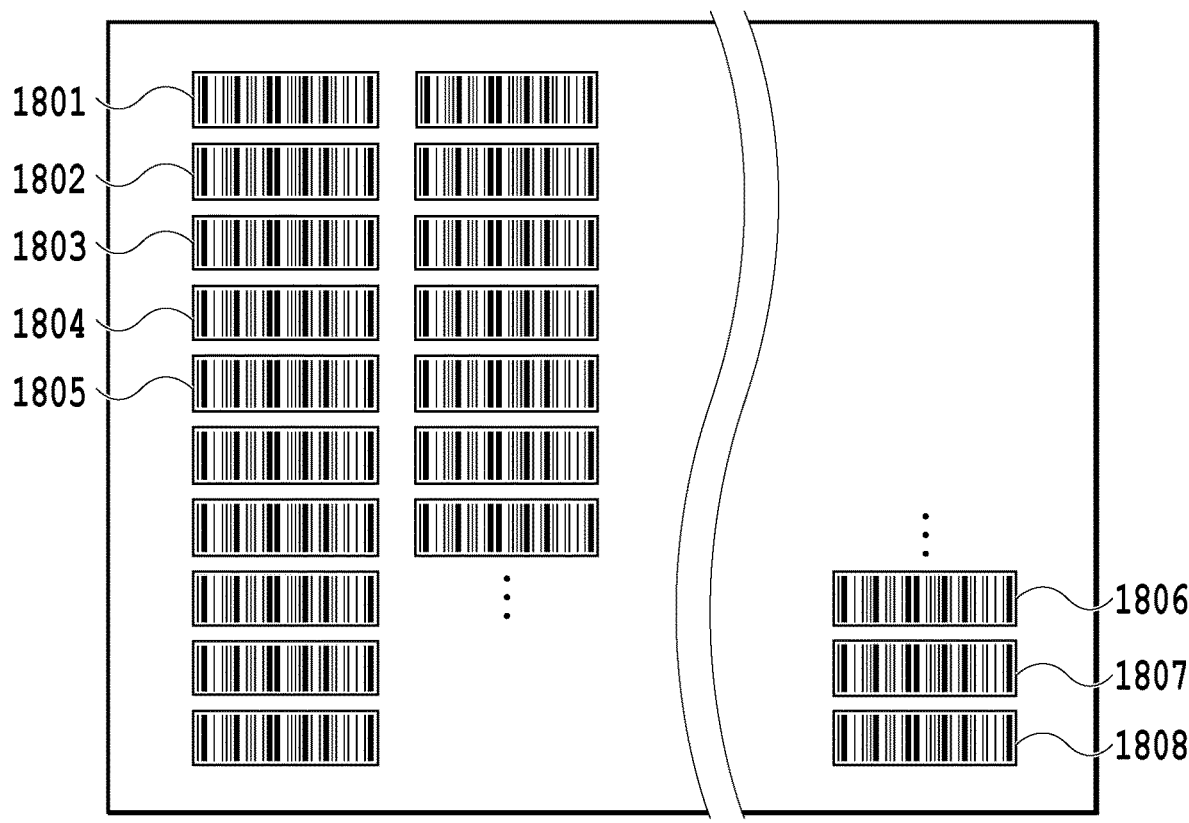
FIG. 18 is an example of a pattern for ink amount determination.

FIG. 17 is an extraction of a portion of the look-up table used in the ink color conversion processing unit 902. The extracted portion is a signal value RGB associated with a signal value CMYK in a case where the image is formed in the cyan ink. This reveals the signal value RGB of image data in which an image is formed in the cyan ink. According to the above, the signal values G and B are fixed at 255 to create data on a predetermined code obtained by shifting an 8-bit signal value R, for example, by two and arranging the values. FIG. 18 is an example of a pattern for ink amount determination. The values of (R, G, B) in a pattern 1801 are (0, 255, 255). The signal values of pixels in a line region shown by black codes are determined such that a pattern 1802 is (2, 255, 255), a pattern 1803 is (4, 255, 255), a pattern 1804 is (6, 255, 255), a pattern 1805 is (8, 255, 255), and so on. The signal value R is further increased so that a pattern 1806 is (252, 255, 255), a pattern 1807 is (254, 255, 255), and a pattern 1808 is (255, 255, 255). Here, in the figure of an example of the patterns in FIG. 18, although the color does not change depending on a signal value, in reality, the patterns have different densities depending on the signal value. That is, in FIG. 18, the pattern 1801 is actually the darkest, and the pattern 1808 is the lightest.

In S1602, the printing apparatus 1A prints the image data on the pattern for ink amount determination. The printing is performed with the printing system 1. In S1603, the printing apparatus 1A reads the printed subject P' on which the pattern for ink amount determination printed in S1602 is printed. The reading is performed with the inspection unit 9A.

In S1604, the printing apparatus 1A appropriately performs image processing of the read image. The image processing here is preprocessing for appropriately recognizing the code. Accordingly, a ratio at which the values of respective channels for (R, G, B) of a read value are synthesized may be changed depending on an ink color or the print density of the code, or only a specific channel may be used to obtain a one-channel image. Alternatively, an existing technique may be used to improve a contrast, a threshold value may be set for the signal value to perform a conversion into a binary black-and-white image, or the two may be executed in combination.

In S1605, the printing apparatus 1A recognizes information included in the code. It is only required that a recognition method follow a recognition method under each code standard. Since the code standard used in the present embodiment is the NW-7, it is only required that characters corresponding to the combination of a thick bar, a thin bar, a thick space, and a thin space be recognized pursuant to the NW-7 standard. The recognition is performed for each signal value pattern. In the present embodiment, in order to determine the cyan ink, a pattern is executed in which the signal values G and B are fixed at 255 to change the signal value R. In addition, for example, in the case of determination of the amount of the magenta ink, it is only required that recognition be performed using a pattern in which the signal values R and B are fixed to change the signal value G. In the case of yellow, it is only required that recognition be performed using a pattern in which the signal values R and G are fixed to change the signal value B. In the present embodiment, since the pattern 1801 is printed darkest and the pattern 1808 is printed lightest, in a case where recognition is sequentially executed from the pattern 1801, the recognition cannot be performed from a pattern with some density. The result of whether the pattern of each signal value can be recognized is stored in the storage unit 132.

In S1606, the printing apparatus 1A stores a recognizable ink amount of each color. It is assumed that patterns in the cyan ink can be recognized normally in a case where the signal values of (R, G, B) are from (0, 255, 255) to (200, 255, 255). A complementary operation performed on the values using a conversion table in FIG. 17 shows that the recognition can be normally performed in a case where the signal value of cyan after the ink color conversion processing is 52 or more.

The ink amount determination procedure in FIG. 16 is used to execute the determination for the magenta ink, the yellow ink, and the black ink in advance in the same manner as for the cyan ink. It is assumed that it has been normally read that after the ink color conversion processing, the signal value of the magenta ink is 52 or more, the signal value of the yellow ink is 200 or more, and the signal value of the black ink is 24 or more, and each value is stored. Then, the printing apparatus 1A ends the procedure in FIG. 16.

As a result, even in the case of trouble with a nozzle of any one color, if the code can be printed normally in the plurality of other ink colors, the code can be recognized with a pattern of a signal value of an ink color in which the code can be printed normally. In a case where the plurality of ink colors include at least one ink color in which printing can be normally performed, the code can be recognized with a pattern of a signal value of the ink color. As described above, the host device HC1 may obtain the ink amount of each color predetermined under the procedure in FIG. 16 by the printing apparatus 1A in S1304. Alternatively, an ink amount assumed from specific performance using the reading sensor in the printing apparatus 1A may be obtained.

The description returns to FIG. 13. In S1305, the host device HC1 updates the signal value of the code. To update the signal value of the code, "an ink color to be used for printing" and "the ink amount of the ink color to be used for printing" which the host device HC1 obtains from the printing apparatus 1A in S1303 and S1304 are used. In the present embodiment, the ink colors to be used for printing are two colors, the cyan ink and the magenta ink. In S1304, the ink amount in which the pattern of each color can be recognized is determined such that the signal value after the ink color conversion processing is 52 or more in the pattern in the cyan ink and the signal value after the ink color conversion processing is 52 or more in the pattern in the magenta ink. Thus, from the look-up table used in the ink color conversion processing unit 902, a combination of (R, G, B) is selected such that the signal value of the cyan ink is 52 or more, the signal value of the magenta ink is 52 or more, and the other ink colors are not used. In a case where there is no combination of (R, G, B) that satisfies the condition only with the ink colors determined in S1303, (R, G, B) may be selected such that a small amount of another ink color is mixed. A region of a bar forming the pattern of the code with the signal values of (R, G, B) is filled in, and code data is completed. Then, the host device HC1 ends the procedure. The code data generation method has been described above. The use of the generation method increases possibilities that even in the case of trouble with any of the nozzles for the plurality of inks to be used for printing, nozzle arrays of the other ink colors may cover code printing to perform the inspection normally. Further, in the present embodiment, the code is printed in a plurality of ink colors. Thus, in the processing in FIG. 14, in a case where a plurality of ink colors do not remain in a process of omitting an ink color using nozzles including a defective nozzle or an ink color causing a color shift, an ink color with a small degree of defect or color shift is not omitted and is kept. This makes it easy to print the code in a plurality of inks.

Next, a description will be given of an analysis on the code printed in a plurality of ink colors in the code analysis unit 1002 of the printing apparatus 1A.

Figure 19:
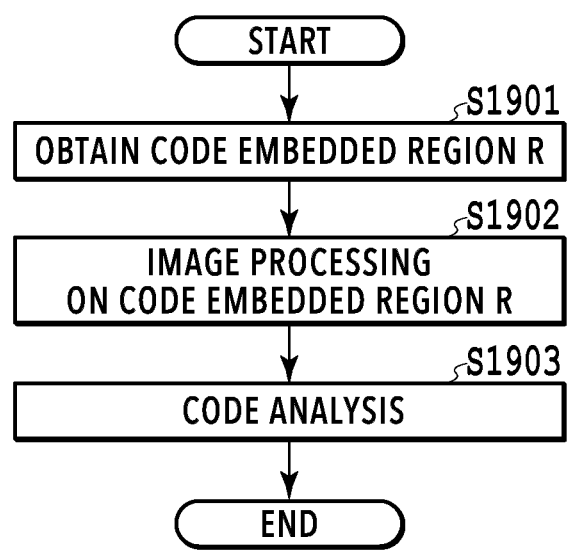
FIG. 19 is a diagram showing a procedure for a code analysis performed in a code analysis unit.

FIG. 19 is a flow chart for an analysis performed by the code analysis unit 1002. The procedure is implemented by the CPU expanding the program stored in the ROM included in the printing apparatus 1A into the RAM and executing the program.

In S1901, the printing apparatus 1A obtains the coordinates of the code embedded region R. It is desirable that the coordinates be transmitted to the printing apparatus 1A in advance in a case where the host device HC1 determines the code embedded region R in S1104. Alternatively, existing pattern matching may be used to obtain the coordinates of the code embedded region R.

In S1902, the printing apparatus 1A executes image processing for the code embedded region R. Here, an image processing range is narrowed down from the entire inspection image input by the inspection input unit 1001 to the code embedded region R to execute the image processing. At that time, different image processing may or may not be executed for a region excluding the code embedded region R from the entire inspection image. In any case, image processing suitable for code recognition is executed for the code embedded region R. The image processing suitable for code recognition is, for example, processing in which a ratio at which the values of the channels (R, G, B) of a read value are synthesized is changed depending on an ink color or the print density of the code, processing in which only a specific channel is used depending on an ink color to obtain a one-channel image, or the like. In the case of using only a specific channel depending on an ink color, it is preferable to use a channel having such a wavelength that the ink color absorbs. For example, a region where the cyan ink is printed absorbs a red wavelength region (about 600 nm), so that an image is captured black in an R channel. On the other hand, a region where the cyan ink is not printed reflects the red wavelength region (about 600 nm), so that the image is captured white in the R channel. As a result, it is possible to obtain a high contrast between the region printed in the cyan ink and the region not printed in the cyan ink. Similarly, a high contrast can be obtained by using a G channel for a region printed in the magenta ink and a B channel for a region printed in the yellow ink. Further, a threshold value may be set for the signal value to make a conversion into a binary black-and-white image, or a pixel value conversion table having a hysteresis characteristic may be used to improve the contrast. The other existing contrast-improving techniques may also be used. Alternatively, the above may be executed in combination. In the present embodiment, the image processing is executed for the code embedded region R out of the inspection images input by the inspection input unit 1001. However, this is equal to the inspection unit 9A performing threshold processing or conversion having the hysteresis characteristic as described above to output an image of high contrast.

In S1903, the printing apparatus 1A analyzes the code. The code analysis is performed using a predetermined existing technique under a code standard. Then, information indicated by a number embedded in the code, a letter of the alphabet, or the like is obtained. After that, the procedure ends. The analysis in this procedure shows document data on a comparison source corresponding to the inspection image, and an inspection is conducted to compare the inspection image with the manuscript data.

Figure 20:
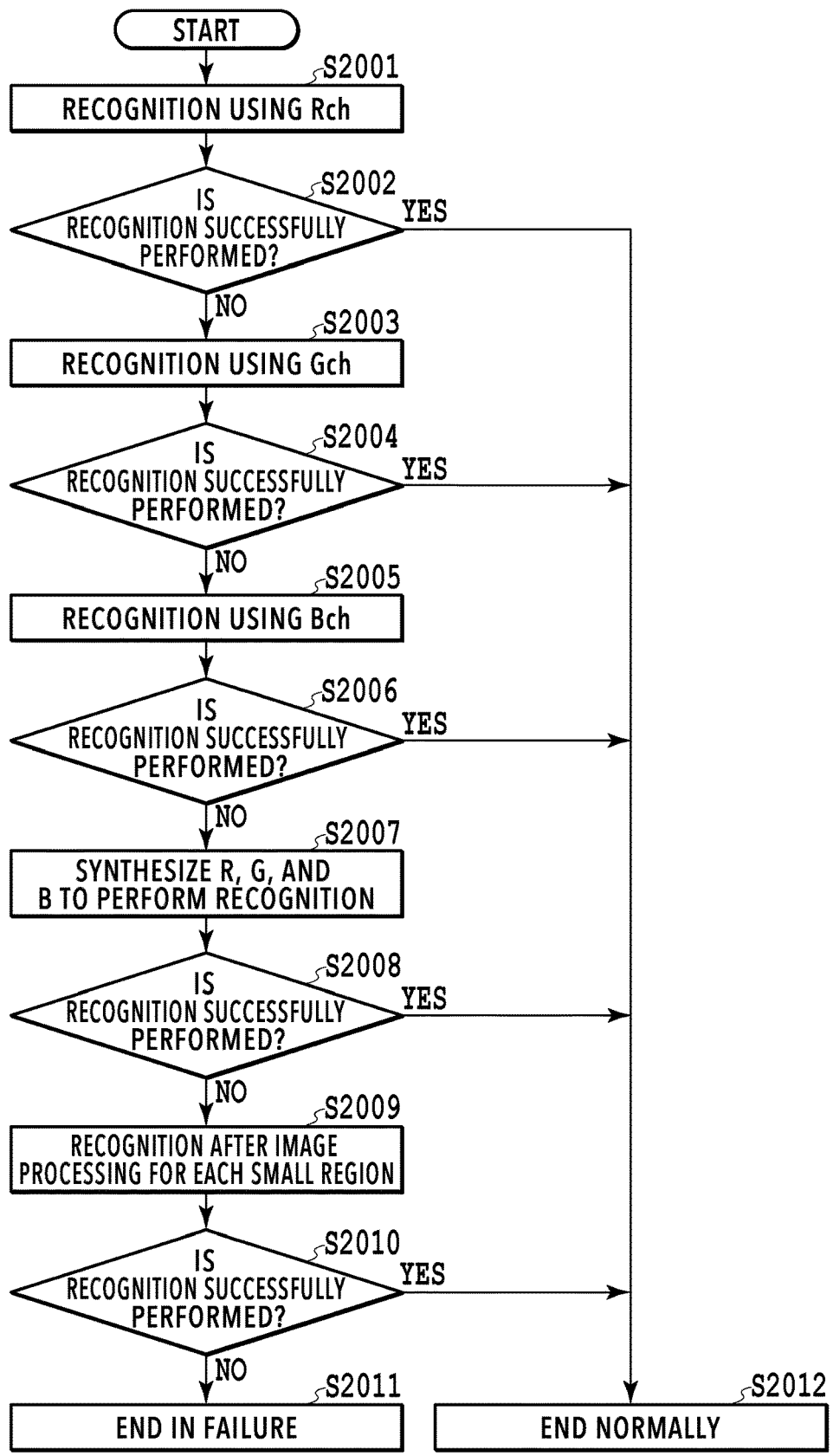
FIG. 20 is a diagram showing a procedure for image processing executed in the code embedded region.

FIG. 20 is an example of a procedure for image processing executed for the code embedded region R by the printing apparatus 1A. The procedure is implemented by the CPU of the host device HC1 expanding the program stored in the ROM of the host device HC1 into the RAM and executing the program.

In S2001, the printing apparatus 1A recognizes the code in the code embedded region R in the data D1 on the first page using the R channel. As described in S1605, it is only required that a code recognition method follow a recognition method under each code standard. In the present procedure, the recognition method is the same below.

In S2002, the printing apparatus 1A determines whether the recognition is successfully performed. In a case where the recognition is successfully performed, the process proceeds to S2012 and the procedure ends. In a case where the recognition is not successfully performed, the process proceeds to S2003. Since the inspection code is printed in the same ink color on all pages, in a case where the D1 on the first page is successfully recognized using the R channel, it is considered that the code recognition is possible from page 2 to page 15 by using the R channel. As described above, based on which step is used in the procedure to successfully recognize the D1 on the first page, recognition is possible on the subsequent pages by the recognition method through the same step.

In S2003, the printing apparatus 1A recognizes the code for the code embedded region R in the data D1 on the first page using the G channel. In S2004, the printing apparatus 1A determines whether the recognition is successfully performed. In a case where the recognition is successfully performed, the process proceeds to S2012 and the procedure ends. In a case where the recognition is not successfully performed, the process proceeds to S2005.

In S2005, the printing apparatus 1A recognizes the code for the code embedded region R in the data D1 on the first page using the B channel. In S2006, the printing apparatus 1A determines whether the recognition is successfully performed. In a case where the recognition is successfully performed, the process proceeds to S2012 and the procedure ends. In a case where the recognition is not successfully performed, the process proceeds to S2007.

In S2007, the printing apparatus 1A synthesizes the R channel, the G channel, and the B channel in the region R to recognize a code. An existing method may be used as a synthesis method. In the present embodiment, a method of synthesizing the signal values of R, G, and B at a ratio of 3:6:1 is used. In S2008, the printing apparatus 1A determines whether the recognition is successfully performed. In a case where the recognition is successfully performed, the process proceeds to S2012 and the procedure ends. In a case where the recognition is not successfully performed, the process proceeds to S2009.

In S2009, the printing apparatus 1A divides an image in each channel into small regions and executes image processing to perform recognition. For example, the R channel is divided into small regions. Then, a contrast distribution is checked in each small region. The G channel and the B channel are similarly divided into small regions to check a contrast distribution. A channel of the highest contrast for each small region is selected and the channels are synthesized, so that the code is recognized. In S2010, the printing apparatus 1A determines whether the recognition is successfully performed. In a case where the recognition is successfully performed, the process proceeds to S2012 and the procedure ends. In a case where the code recognition is not successfully performed by any method, a recognition error is issued in S2011 and the process ends.

As described above, according to the present embodiment, it is possible to improve the accuracy of the code recognition. Specifically, by printing the code in a plurality of ink colors, even in the case of trouble with a nozzle for any ink of the plurality of ink colors, a code printed in another ink color can be recognized. Further, using the method of division into small regions described in S2009 increases possibilities that a normal recognition can be performed even in a case where any ink color cannot be normally printed in a portion of the code region.

Second Embodiment

In the first embodiment, the ink used for the explanation is assumed to include the coloring material. However, the component of the ink is not limited to this. For example, an invisible ink may be used. The invisible ink is, for example, an ink which cannot be recognized as a color under visible light such as sunlight but has a characteristic of emitting fluorescence in a visible light region in the case of being irradiated with a specific wavelength such as ultraviolet rays. In the present embodiment, a description will be given of a method of generating an inspection code using an invisible ink that emits light by irradiation with ultraviolet rays with reference to the flow charts in FIGS. 13, 14, and 16 as in the first embodiment. Incidentally, since the method is the same as that in the first embodiment except that the invisible ink is used to generate the code, differences from the first embodiment will be mainly described below, and the other necessary portions will be described as appropriate.

The host device HC1 carries out S1301 and S1302 in the same manner as in the first embodiment in the code data generation method procedure shown in FIG. 13. In S1304, the host device HC1 determines an ink color to be used to print the code using the procedure in FIG. 14.

In S1401, the host device HC1 determines a plurality of ink color candidates for printing the code. In the present embodiment, the following four ink colors are the candidates: the cyan ink, the magenta ink, the yellow ink, and the invisible ink which are some of the ink colors which can be printed by the printing apparatus 1A. In S1402 to S1406, the same procedure as in the first embodiment is carried out for the four colors including the invisible ink.

The description returns to FIG. 13. In S1304, the host device HC1 obtains the ink amounts of four colors including the invisible ink. The ink amount of each color is predetermined using the procedure in FIG. 16.

In the ink amount determination procedure in FIG. 16, in S1601 and S1602, the same as in the first embodiment is carried out for the four colors including the invisible ink. In S1603, the printing apparatus 1A irradiates the invisible ink with ultraviolet rays to execute reading. The subsequent steps in FIG. 16 are the same as those in the first embodiment.

The description returns to FIG. 13. In S1305, the host device HC1 updates the pixel value of the code including the invisible ink. The update is completed, and then the host device HC1 ends the code generation procedure.

According to the above description, code data can be generated in a plurality of ink colors including the invisible ink.

Next, a description will be given below of a method of inspecting a printed subject P' on which data in which the code of the present embodiment is embedded is printed with reference to FIG. 10. The inspection image input unit 1001 inputs the inspection image photographed by the above-mentioned inspection unit 9A into the inspection unit 138. The inspection image is an image obtained by photographing the printed subject P' to be inspected. In the present embodiment, the code embedded region R is image-captured by being irradiated at least with ultraviolet rays. The same procedure as in the first embodiment is carried out for the code analysis unit 1002 to the inspection result output unit 1005. As described above, the code is printed in a plurality of ink colors also in the present embodiment, and the same result as that described in the first embodiment can be obtained.

Third Embodiment

In the procedure for determining the ink color to be used to print the code described with reference to FIG. 14, the plurality of ink colors are determined in the first and second embodiments. In the present embodiment, in S1401 of the flow chart in FIG. 14, the number of ink color candidates to be used to print the code is determined to be one. In this case, it is not necessary to execute the subsequent steps. Alternatively, as a result of determining a plurality of ink color candidates in S1401 and executing processes from S1402 to S1406, only one ink color may remain. In the present embodiment, unlike the first and second embodiments, priority is given to omitting an ink color in which any nozzle trouble or color shift occurs, rather than keeping a plurality of ink colors to be used to print the code. Even in a case where the code is printed in only one ink color, the same result as that in the first and second embodiments can be obtained in a case where the code can be normally printed in the ink.

A description will be given below of a case where the code is printed in only one color in the present embodiment. A method of determining the amount of the black ink will be taken as an example to give the description. As described with reference to FIG. 16 in the first embodiment, the code in the black ink can be read normally in a case where the signal value after the ink color conversion processing is 24 or more. Further, as described with reference to FIG. 8, the discharge substrates 301, 302, 303, 304 . . . have eight nozzle arrays from the nozzle array a to the nozzle array h as described above. In the case of printing the code in only one ink color, the ink amount is stored so that the ink amount per array is 24 or more. Accordingly, in a case where printing is performed with eight nozzle arrays from the nozzle array a to the nozzle array h, the ink amount of 192, which is eight times 24, or more is stored. It is only required that the stored ink amount be obtained in S1304 in the code data generation method procedure shown in FIG. 13 and that the pixel value of the code be updated in S1305. This increases the possibility of reading the code normally even in the case of trouble in any nozzle array even in a case where the number of ink colors used to print the code is one.

In the present embodiment, the description has been given above of the method of determining the ink amount in the case of printing the code in only one black ink color. The present invention is not limited to the above description. For example, a nozzle array to be used may be selected out of the eight nozzle arrays before determining the ink amount. It is only required that the selection be performed after replacing the "ink color" in the flow chart in FIG. 14 with a "nozzle array." This enables omitting in advance a defective nozzle array or a nozzle array with which a printing position deviates by a predetermined amount or more due to a deviation in discharge timing in the case of printing the code in one black ink color.

Other Embodiment

In the above embodiments, the printing unit 3 includes a plurality of print heads 30 but may include one print head 30. The print head 30 does not have to be a full-line head but may use a serial system in which an ink is discharged from the print head 30 while moving the carriage on which the print head 30 is detachably mounted in the Y direction to form an ink image.

The mechanism for conveying the print medium P may be another system such as a system to sandwich the print medium P between a pair of rollers and convey the print medium P. In a system to convey the print medium P with a pair of rollers or the like, a roll sheet may be used as the print medium P, or the roll sheet may be cut after transfer to produce a printed subject P'.

In the above embodiments, the transfer body 2 is provided on the outer peripheral surface of the transfer drum 41. However, another system such as a system in which the transfer body 2 is formed in an endless band shape and is cyclically moved may be used.

The inspection code described in the above embodiments is printed using an ink color determined by applying the present embodiment regardless of the pixel value of the image in the imposition image data or a print mode such as a color mode or a monochrome mode for printing the code.

In each embodiment, the inspection code is generated by the print data generation unit 202 of the host device HC1, which is an information processing device, but can be generated in the main controller 13A of the printing apparatus 1A by receiving the document data from the host device HC1 or another device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-134890, filed Aug. 20, 2021, which is hereby incorporated by reference wherein in its entirety.

What is claimed is:

1. A printing apparatus comprising:
   an obtaining unit configured to obtain print data in which in imposition image data in which one or more images are imposed in a print region, a code for identifying each image in the imposition image data is embedded;
   a determination unit configured to determine an ink color to be used to print the code by excluding an ink color satisfying a predetermined condition from candidates for the ink color to be used to print the code; and
   a print control unit configured to print the code based on the print data obtained by the obtaining unit using a plurality of nozzle arrays for the ink color determined by the determination unit.

2. The printing apparatus according to claim 1, wherein the plurality of nozzle arrays include nozzle arrays for different ink colors.

3. The printing apparatus according to claim 1, wherein the plurality of nozzle arrays include a nozzle array for discharging an invisible ink.

4. The printing apparatus according to claim 1, wherein the predetermined condition includes occurrence of nozzle trouble in a printing position of the code.

5. The printing apparatus according to claim 4, wherein the nozzle trouble occurs due to a defect in the nozzle.

6. The printing apparatus according to claim 1, wherein the predetermined condition includes deviation of the printing position of the code by a predetermined value or more.

7. The printing apparatus according to claim 1, wherein the determination unit determines the ink color to be used to print the code regardless of a pixel value of an image in the imposition image data.

8. The printing apparatus according to claim 1, wherein the determination unit determines the ink color to be used to print the code regardless of a color mode of printing the print data.

9. The printing apparatus according to claim 1, wherein the determination unit determines a plurality of ink color candidates to be used to print the code.

10. The printing apparatus according to claim 1, wherein the code is printed at such a density that the code can be read even in a state where any of the plurality of ink color candidates lacks or a state where part of the nozzle arrays lack.

11. The printing apparatus according to claim 1, wherein an ink amount of each ink color for printing the code is determined based on a stage where a pattern for ink amount determination printed at multiple levels of densities is successfully read.

12. The printing apparatus according to claim 11, wherein the pattern for ink amount determination is created with reference to a look-up table in which a value of a signal value CMYK for each ink color is associated with a value obtained by converting the ink color into a signal value RGB.

13. The printing apparatus according to claim 12, wherein in a case where the code includes an ink color which cannot be recognized normally, an appropriate channel of the signal value RGB is selected to recognize the code.

14. The printing apparatus according to claim 12, wherein in a case where the region where the code is printed includes a region in a state where the nozzle array is not recognized normally, an appropriate channel of the signal value RGB for each region is selected to recognize the code.

15. The printing apparatus according to claim 1, wherein the plurality of nozzle arrays are different nozzle arrays for an identical ink color.

16. The printing apparatus according to claim 1, wherein the determination unit determines that a number of ink colors to be used to print the code is one.

17. The printing apparatus according to claim 1, further comprising an inspection unit configured to read a printed subject on which the code is printed to perform an inspection using the code.

18. The printing apparatus according to claim 17, wherein the inspection unit performs image processing on a predetermined region including the region where the code is printed in the printed subject.

19. A method of controlling a printing apparatus, the method comprising:
    obtaining print data in which in imposition image data in which one or more images are imposed in a print region, a code for identifying each image in the imposition image data is embedded;
    determining an ink color to be used to print the code by excluding an ink color satisfying a predetermined condition from candidates for the ink color to be used to print the code; and
    controlling printing of the code based on the print data obtained by the obtaining using a plurality of nozzle arrays for the ink color determined by the determining.

20. A non-transitory computer readable storage medium storing a program which causes a computer to comprise:
    an obtaining unit configured to obtain print data in which in imposition image data in which one or more images are imposed in a print region, a code for identifying each image in the imposition image data is embedded;
    a determination unit configured to determine an ink color to be used to print the code by excluding an ink color satisfying a predetermined condition from candidates for the ink color to be used to print the code; and
    a print control unit configured to print the code based on the print data obtained by the obtaining unit using a plurality of nozzle arrays for the ink color determined by the determination unit.

21. A printing system comprising an information processing device and a printing apparatus,
    the information processing device comprising:
        a code generation unit configured to generate a code for identifying each image in imposition image data in which one or more images are imposed in a print region;
        a print data generation unit configured to generate print data such that the code is arranged based on the code generation unit; and
        an output unit configured to output to the printing apparatus the print data generated by the print data generation unit,
    the printing apparatus comprising:
        an obtaining unit configured to obtain the print data in which the code is embedded;
        a determination unit configured to determine an ink color to be used to print the code by excluding an ink color satisfying a predetermined condition from candidates for the ink color to be used to print the code;
        a print control unit configured to print the code based on the print data obtained by the obtaining unit using a plurality of nozzle arrays for the ink color determined by the determination unit; and
        an inspection unit configured to read a printed subject to perform an inspection using the code.

* * * * *